(12) United States Patent
Miller et al.

(10) Patent No.: US 8,707,410 B2
(45) Date of Patent: *Apr. 22, 2014

(54) SYSTEM AND METHOD FOR SINGLE SESSION SIGN-ON

(75) Inventors: Lawrence R Miller, New York, NY (US); Martin J. Trenholm, London (GB)

(73) Assignee: JPMorgan Chase Bank, N.A., New York, NY (US)

( * ) Notice: Subject to any disclaimer, the term of this patent is extended or adjusted under 35 U.S.C. 154(b) by 51 days.

This patent is subject to a terminal disclaimer.

(21) Appl. No.: 13/163,293

(22) Filed: Jun. 17, 2011

(65) Prior Publication Data

US 2011/0252465 A1    Oct. 13, 2011

Related U.S. Application Data

(63) Continuation of application No. 10/026,403, filed on Dec. 21, 2001, now Pat. No. 7,987,501.

(60) Provisional application No. 60/338,359, filed on Dec. 4, 2001.

(51) Int. Cl.
    *H04L 29/06*    (2006.01)
(52) U.S. Cl.
    USPC .............................................. 726/8; 713/185
(58) Field of Classification Search
    USPC .............................................. 726/8; 713/185
    See application file for complete search history.

(56) References Cited

U.S. PATENT DOCUMENTS

| | | | |
|---|---|---|---|
| 2,005,003 A | 6/1935 | Patton et al. |
| 2,405,500 A | 8/1946 | Guanella |
| 3,665,162 A | 5/1972 | Yamamoto et al. |
| 3,938,090 A | 2/1976 | Borison et al. |
| 4,123,747 A | 10/1978 | Lancto et al. |
| 4,160,120 A | 7/1979 | Barnes et al. |
| 4,200,770 A | 4/1980 | Hellman et al. |
| 4,223,403 A | 9/1980 | Konheim et al. |
| 4,249,180 A | 2/1981 | Eberle et al. |
| 4,255,811 A | 3/1981 | Adler |

(Continued)

FOREIGN PATENT DOCUMENTS

| | | |
|---|---|---|
| EP | 1014318 | 6/2000 |
| EP | 0590861 | 1/2001 |

(Continued)

OTHER PUBLICATIONS

Alshawi, M et. al., An IFC Web Based Collaborative Construction Computer Environment Wisper (1999).

(Continued)

*Primary Examiner* — Michael Pyzocha
(74) *Attorney, Agent, or Firm* — Hunton & Williams LLP

(57) ABSTRACT

A method and system for cross-system authentication or credentialing of clients. Credentials from one system (e.g., system 2) are placed on a client, such as with a cookie on a browser, and the credentials are then extracted by another system (e.g., system 1), and used by system 1 to impersonate the client to system 2. If the client's credentials with system 2 are valid, system 2 provides that information to system 1 (which is impersonating the client), and system 1 uses the validity of the credentials from system 2 to grant the client access to protected resources on system 1.

19 Claims, 5 Drawing Sheets

(56) References Cited

U.S. PATENT DOCUMENTS

| | | |
|---|---|---|
| 4,302,810 A | 11/1981 | Bouricius et al. |
| 4,316,055 A | 2/1982 | Feistel |
| 4,319,336 A | 3/1982 | Andersen et al. |
| 4,405,829 A | 9/1983 | Rivest et al. |
| 4,453,074 A | 6/1984 | Weinstein |
| 4,454,414 A | 6/1984 | Benton |
| 4,471,164 A | 9/1984 | Henry |
| 4,523,087 A | 6/1985 | Benton |
| 4,529,870 A | 7/1985 | Chaum |
| 4,567,359 A | 1/1986 | Lockwood |
| 4,575,621 A | 3/1986 | Dreifus |
| 4,605,820 A | 8/1986 | Campbell, Jr. |
| 4,605,844 A | 8/1986 | Haggan |
| 4,614,861 A | 9/1986 | Pavlov et al. |
| 4,641,239 A | 2/1987 | Takesako |
| 4,650,981 A | 3/1987 | Foletta |
| 4,661,658 A | 4/1987 | Matyas |
| 4,663,500 A | 5/1987 | Okamoto et al. |
| 4,697,072 A | 9/1987 | Kawana |
| 4,701,601 A | 10/1987 | Francini et al. |
| 4,713,760 A | 12/1987 | Yamada et al. |
| 4,723,246 A | 2/1988 | Weldon |
| 4,747,050 A | 5/1988 | Brachtl et al. |
| 4,747,139 A | 5/1988 | Taaffe |
| 4,752,676 A | 6/1988 | Leonard et al. |
| 4,845,347 A | 7/1989 | Mccrindle |
| 4,859,837 A | 8/1989 | Halpern |
| 4,868,877 A | 9/1989 | Fischer |
| 4,877,847 A | 10/1989 | Masu et al. |
| 4,890,324 A | 12/1989 | Jansen |
| 4,891,503 A | 1/1990 | Jewell |
| 4,965,568 A | 10/1990 | Atalla et al. |
| 4,977,501 A | 12/1990 | Lefevre |
| 4,980,913 A | 12/1990 | Skret |
| 4,984,272 A | 1/1991 | Mcilroy et al. |
| 5,001,755 A | 3/1991 | Skret |
| 5,005,200 A | 4/1991 | Fischer |
| 5,016,274 A | 5/1991 | Micali et al. |
| 5,018,196 A | 5/1991 | Takaragi et al. |
| 5,023,782 A | 6/1991 | Lutz et al. |
| 5,025,372 A | 6/1991 | Burton et al. |
| 5,054,067 A | 10/1991 | Moroney et al. |
| 5,056,019 A | 10/1991 | Schultz et al. |
| 5,072,380 A | 12/1991 | Randelman et al. |
| 5,097,115 A | 3/1992 | Ogasawara et al. |
| 5,122,950 A | 6/1992 | Mee |
| 5,161,244 A | 11/1992 | Maurer |
| 5,163,098 A | 11/1992 | Dahbura |
| 5,175,682 A | 12/1992 | Higashiyama |
| 5,196,840 A | 3/1993 | Leith et al. |
| 5,212,792 A | 5/1993 | Gerety et al. |
| 5,225,664 A | 7/1993 | Iijima |
| 5,231,569 A | 7/1993 | Myatt et al. |
| 5,231,668 A | 7/1993 | Kravitz |
| 5,237,620 A | 8/1993 | Deaton |
| 5,253,294 A | 10/1993 | Maurer |
| 5,257,486 A | 11/1993 | Holmwall |
| 5,265,008 A | 11/1993 | Benton et al. |
| 5,267,314 A | 11/1993 | Stambler |
| 5,276,311 A | 1/1994 | Hennige |
| 5,302,810 A | 4/1994 | Gauthier et al. |
| 5,305,456 A | 4/1994 | Boitana |
| 5,311,594 A | 5/1994 | Penzias |
| 5,315,504 A | 5/1994 | Lembie |
| 5,319,710 A | 6/1994 | Atalla et al. |
| 5,341,428 A | 8/1994 | Schatz |
| 5,351,187 A | 9/1994 | Hassett |
| 5,352,877 A | 10/1994 | Morley |
| 5,367,572 A | 11/1994 | Weiss |
| 5,382,784 A | 1/1995 | Eberhardt |
| 5,428,684 A | 6/1995 | Akiyama et al. |
| 5,430,644 A | 7/1995 | Deaton et al. |
| 5,432,326 A | 7/1995 | Noblett et al. |
| 5,448,471 A | 9/1995 | Deaton et al. |
| 5,450,491 A | 9/1995 | McNair |
| 5,466,920 A | 11/1995 | Nair et al. |
| 5,469,576 A | 11/1995 | Dauerer et al. |
| 5,479,530 A | 12/1995 | Nair et al. |
| 5,483,444 A | 1/1996 | Heintzeman et al. |
| 5,495,981 A | 3/1996 | Warther |
| 5,500,890 A | 3/1996 | Rogge et al. |
| 5,502,636 A | 3/1996 | Clarke |
| 5,513,102 A | 4/1996 | Auriemma |
| 5,524,073 A | 6/1996 | Stambler |
| 5,532,689 A | 7/1996 | Bueno |
| 5,539,825 A | 7/1996 | Akiyama et al. |
| 5,541,583 A | 7/1996 | Mandelbaum |
| 5,550,734 A | 8/1996 | Tater |
| 5,555,303 A | 9/1996 | Stambler |
| 5,583,778 A | 12/1996 | Wind |
| 5,583,933 A | 12/1996 | Mark |
| 5,590,038 A | 12/1996 | Pitroda |
| 5,590,197 A | 12/1996 | Chen |
| 5,590,199 A | 12/1996 | Krajewski et al. |
| 5,592,378 A | 1/1997 | Cameron |
| 5,615,277 A | 3/1997 | Hoffman |
| 5,617,474 A | 4/1997 | Ditzig et al. |
| 5,642,485 A | 6/1997 | Deaton et al. |
| 5,644,723 A | 7/1997 | Deaton et al. |
| 5,644,778 A | 7/1997 | Burks et al. |
| 5,646,998 A | 7/1997 | Stambler |
| 5,649,114 A | 7/1997 | Deaton et al. |
| 5,649,118 A | 7/1997 | Carlisle et al. |
| 5,652,786 A | 7/1997 | Rogers |
| 5,657,390 A | 8/1997 | Elgamal et al. |
| 5,659,469 A | 8/1997 | Deaton et al. |
| 5,677,521 A | 10/1997 | Garrou |
| 5,680,459 A | 10/1997 | Hook et al. |
| 5,684,950 A | 11/1997 | Dare et al. |
| 5,687,322 A | 11/1997 | Deaton et al. |
| 5,692,124 A | 11/1997 | Holden et al. |
| 5,698,837 A | 12/1997 | Furuta |
| 5,704,044 A | 12/1997 | Tarter et al. |
| 5,706,452 A | 1/1998 | Ivanov |
| 5,724,423 A | 3/1998 | Khello |
| 5,742,845 A | 4/1998 | Wagner |
| 5,745,555 A | 4/1998 | Mark |
| 5,764,770 A | 6/1998 | Schipper et al. |
| 5,789,732 A | 8/1998 | Mcmahon et al. |
| 5,793,302 A | 8/1998 | Stambler |
| 5,796,827 A | 8/1998 | Coppersmith et al. |
| 5,825,003 A | 10/1998 | Jennings et al. |
| 5,825,871 A | 10/1998 | Mark |
| 5,825,890 A | 10/1998 | Elgamal et al. |
| 5,826,023 A | 10/1998 | Hall et al. |
| 5,832,090 A | 11/1998 | Raspotnik |
| 5,832,457 A | 11/1998 | O'brien |
| 5,838,812 A | 11/1998 | Pare et al. |
| 5,838,903 A | 11/1998 | Blakely et al. |
| 5,841,869 A | 11/1998 | Merkling et al. |
| 5,842,421 A | 12/1998 | Desilets et al. |
| 5,848,190 A | 12/1998 | Kleehammer et al. |
| 5,852,811 A | 12/1998 | Atkins |
| 5,857,023 A | 1/1999 | Demers et al. |
| 5,859,419 A | 1/1999 | Wynn |
| 5,861,906 A | 1/1999 | Dunn et al. |
| 5,864,871 A | 1/1999 | Kitain et al. |
| 5,870,456 A | 2/1999 | Rogers |
| 5,870,721 A | 2/1999 | Norris |
| 5,875,296 A | 2/1999 | Shi et al. |
| 5,878,141 A | 3/1999 | Daly et al. |
| 5,878,405 A | 3/1999 | Grant et al. |
| 5,884,312 A | 3/1999 | Dustan et al. |
| 5,898,838 A | 4/1999 | Wagner |
| 5,903,878 A | 5/1999 | Talati et al. |
| 5,905,908 A | 5/1999 | Wagner |
| 5,907,142 A | 5/1999 | Kelsey |
| 5,923,552 A | 7/1999 | Brown et al. |
| 5,933,812 A | 8/1999 | Meyer et al. |
| 5,936,541 A | 8/1999 | Stambler |
| 5,940,811 A | 8/1999 | Norris |
| 5,940,843 A | 8/1999 | Zucknovich et al. |
| 5,963,647 A | 10/1999 | Downing et al. |
| 5,963,915 A | 10/1999 | Kirsch |

(56) References Cited

U.S. PATENT DOCUMENTS

| | | |
|---|---|---|
| 5,970,480 A | 10/1999 | Kalina |
| 5,974,148 A | 10/1999 | Stambler |
| 5,982,370 A | 11/1999 | Kamper |
| 5,991,740 A | 11/1999 | Messer |
| 5,991,878 A | 11/1999 | Mcdonough et al. |
| 5,999,971 A | 12/1999 | Buckland |
| 6,000,832 A | 12/1999 | Franklin et al. |
| 6,005,943 A | 12/1999 | Cohen et al. |
| 6,009,411 A | 12/1999 | Kepecs |
| 6,012,049 A | 1/2000 | Kawan |
| 6,026,398 A | 2/2000 | Brown et al. |
| 6,029,141 A | 2/2000 | Bezos et al. |
| 6,029,153 A | 2/2000 | Bauchner et al. |
| 6,029,890 A | 2/2000 | Austin |
| 6,032,136 A | 2/2000 | Brake, Jr. et al. |
| 6,036,099 A | 3/2000 | Leighton |
| 6,041,357 A | 3/2000 | Kunzelman et al. |
| 6,044,402 A | 3/2000 | Jacobson et al. |
| 6,047,268 A | 4/2000 | Bartoli et al. |
| 6,061,660 A | 5/2000 | Eggleston et al. |
| 6,067,531 A | 5/2000 | Hoyt et al. |
| 6,069,968 A | 5/2000 | Shaw et al. |
| 6,092,057 A | 7/2000 | Zimmermann et al. |
| 6,105,006 A | 8/2000 | Davis et al. |
| 6,105,007 A | 8/2000 | Norris |
| 6,108,642 A | 8/2000 | Findley |
| 6,115,641 A | 9/2000 | Brown et al. |
| 6,115,642 A | 9/2000 | Brown et al. |
| 6,119,933 A | 9/2000 | Wong et al. |
| 6,138,911 A | 10/2000 | Fredregill et al. |
| 6,144,848 A | 11/2000 | Walsh et al. |
| 6,161,113 A | 12/2000 | Mora et al. |
| 6,163,771 A | 12/2000 | Walker et al. |
| 6,169,974 B1 | 1/2001 | Baumgartner et al. |
| 6,178,408 B1 | 1/2001 | Copple et al. |
| 6,182,059 B1 | 1/2001 | Angotti et al. |
| 6,188,309 B1 | 2/2001 | Levine |
| 6,189,787 B1 | 2/2001 | Dorf |
| 6,202,066 B1 | 3/2001 | Barkley |
| 6,213,391 B1 | 4/2001 | Lewis |
| 6,223,168 B1 | 4/2001 | Mcgurl et al. |
| 6,226,752 B1 | 5/2001 | Gupta et al. |
| 6,243,689 B1 | 6/2001 | Norton |
| 6,278,996 B1 | 8/2001 | Richardson et al. |
| 6,289,324 B1 | 9/2001 | Kawan |
| 6,292,786 B1 | 9/2001 | Deaton et al. |
| 6,315,195 B1 | 11/2001 | Ramachandran |
| 6,317,838 B1 | 11/2001 | Baize |
| 6,321,337 B1 | 11/2001 | Reshef et al. |
| 6,327,575 B1 | 12/2001 | Katz |
| 6,330,543 B1 | 12/2001 | Kepecs |
| 6,332,126 B1 | 12/2001 | Peirce et al. |
| 6,334,108 B1 | 12/2001 | Deaton et al. |
| 6,339,423 B1 | 1/2002 | Sampson |
| 6,341,724 B2 | 1/2002 | Campisano |
| 6,343,323 B1 | 1/2002 | Kalpio et al. |
| 6,349,290 B1 | 2/2002 | Horowitz et al. |
| 6,356,881 B1 | 3/2002 | Milch et al. |
| 6,360,209 B1 | 3/2002 | Loeb et al. |
| 6,360,250 B1 | 3/2002 | Anupam et al. |
| 6,360,254 B1 | 3/2002 | Linden et al. |
| 6,366,682 B1 | 4/2002 | Hoffman et al. |
| 6,381,587 B1 | 4/2002 | Guzelsu |
| 6,401,206 B1 | 6/2002 | Khan et al. |
| 6,404,866 B1 | 6/2002 | Hopper et al. |
| 6,405,175 B1 | 6/2002 | Ng |
| 6,405,181 B2 | 6/2002 | Lent et al. |
| 6,409,080 B2 | 6/2002 | Kawagishi |
| 6,411,947 B1 | 6/2002 | Rice et al. |
| 6,421,768 B1 | 7/2002 | Purpura |
| 6,424,947 B1 | 7/2002 | Tsuria et al. |
| 6,424,949 B1 | 7/2002 | Deaton et al. |
| 6,424,951 B1 | 7/2002 | Shurling et al. |
| 6,434,534 B1 | 8/2002 | Walker et al. |
| 6,438,219 B1 | 8/2002 | Karau et al. |
| 6,446,053 B1 | 9/2002 | Elliott |
| 6,446,111 B1 | 9/2002 | Lowery |
| 6,470,357 B1 | 10/2002 | Garcia et al. |
| 6,484,149 B1 | 11/2002 | Jammes et al. |
| 6,490,601 B1 | 12/2002 | Markus et al. |
| 6,498,657 B1 | 12/2002 | Kuntz et al. |
| 6,505,773 B1 | 1/2003 | Palmer et al. |
| 6,510,464 B1 | 1/2003 | Grantges et al. |
| 6,513,019 B2 | 1/2003 | Lewis |
| 6,516,302 B1 | 2/2003 | Deaton et al. |
| 6,516,416 B2 | 2/2003 | Gregg et al. |
| 6,519,763 B1 | 2/2003 | Kaufer et al. |
| 6,539,027 B1 | 3/2003 | Cambron |
| 6,539,363 B1 | 3/2003 | Allgeier et al. |
| 6,546,392 B1 | 4/2003 | Bahlmann |
| 6,549,972 B1 | 4/2003 | Berstis et al. |
| 6,560,581 B1 | 5/2003 | Fox et al. |
| 6,564,189 B1 | 5/2003 | Nycz |
| 6,567,791 B2 | 5/2003 | Lent et al. |
| 6,571,216 B1 | 5/2003 | Garg et al. |
| 6,578,012 B1 | 6/2003 | Storey |
| 6,584,505 B1 | 6/2003 | Howard et al. |
| 6,587,835 B1 | 7/2003 | Treyz et al. |
| 6,594,640 B1 | 7/2003 | Postrel |
| 6,607,127 B2 | 8/2003 | Wong |
| 6,609,104 B1 | 8/2003 | Deaton et al. |
| 6,611,498 B1 | 8/2003 | Baker et al. |
| 6,611,811 B1 | 8/2003 | Deaton et al. |
| 6,611,819 B1 | 8/2003 | Oneda |
| 6,624,761 B2 | 9/2003 | Fallon |
| 6,631,849 B2 | 10/2003 | Blossom |
| 6,641,050 B2 | 11/2003 | Kelley et al. |
| 6,647,376 B1 | 11/2003 | Farrar et al. |
| 6,651,168 B1 | 11/2003 | Kao et al. |
| 6,662,215 B1 | 12/2003 | Moskowitz et al. |
| 6,668,321 B2 | 12/2003 | Nendell et al. |
| 6,668,322 B1 | 12/2003 | Wood et al. |
| 6,671,818 B1 | 12/2003 | Mikurak |
| 6,678,664 B1 | 1/2004 | Ganesan |
| 6,684,195 B1 | 1/2004 | Deaton et al. |
| 6,684,212 B1 | 1/2004 | Day et al. |
| 6,684,248 B1 | 1/2004 | Janacek et al. |
| 6,687,222 B1 | 2/2004 | Albert et al. |
| 6,691,232 B1 | 2/2004 | Wood et al. |
| 6,714,919 B1 | 3/2004 | Findley |
| 6,718,313 B1 | 4/2004 | Lent et al. |
| 6,718,388 B1 | 4/2004 | Yarborough et al. |
| 6,721,743 B1 | 4/2004 | Sakakibara |
| 6,727,802 B2 | 4/2004 | Kelly et al. |
| 6,735,778 B2 | 5/2004 | Khoo et al. |
| D490,840 S | 6/2004 | Arakaki et al. |
| D491,186 S | 6/2004 | Arakaki et al. |
| D491,953 S | 6/2004 | Arakaki et al. |
| 6,754,640 B2 | 6/2004 | Bozeman |
| 6,754,833 B1 | 6/2004 | Black et al. |
| 6,763,388 B1 | 7/2004 | Tsimelzon |
| 6,775,783 B1 | 8/2004 | Trostle |
| D496,365 S | 9/2004 | Liu et al. |
| 6,792,572 B1 | 9/2004 | Frohlick |
| 6,795,809 B2 | 9/2004 | O'brien et al. |
| 6,795,812 B1 | 9/2004 | Lent et al. |
| 6,804,786 B1 | 10/2004 | Chamley et al. |
| 6,807,285 B1 | 10/2004 | Iwamura |
| D498,236 S | 11/2004 | Liu et al. |
| 6,817,008 B2 | 11/2004 | Ledford et al. |
| 6,817,521 B1 | 11/2004 | Matada |
| 6,820,061 B2 | 11/2004 | Postrel |
| 6,829,586 B2 | 12/2004 | Postrel |
| 6,832,202 B1 | 12/2004 | Schuyler et al. |
| 6,832,587 B2 | 12/2004 | Wampula et al. |
| 6,842,739 B2 | 1/2005 | Postrel |
| 6,847,991 B1 | 1/2005 | Kurapati |
| 6,856,970 B1 | 2/2005 | Campbell et al. |
| RE38,717 E | 3/2005 | Bothwell |
| 6,865,547 B1 | 3/2005 | Brake, Jr. et al. |
| 6,868,391 B1 | 3/2005 | Hultgren |
| 6,874,139 B2 | 3/2005 | Krueger et al. |
| 6,889,198 B2 | 5/2005 | Kawan |
| 6,892,231 B2 | 5/2005 | Jager |

(56) References Cited

U.S. PATENT DOCUMENTS

| | | |
|---|---|---|
| 6,901,375 B2 | 5/2005 | Fernandez |
| 6,901,406 B2 | 5/2005 | Nabe et al. |
| 6,912,315 B1 | 6/2005 | Wong et al. |
| 6,912,529 B1 | 6/2005 | Kolfman |
| 6,915,271 B1 | 7/2005 | Meyer et al. |
| 6,920,611 B1 | 7/2005 | Spaeth et al. |
| 6,925,441 B1 | 8/2005 | Jones et al. |
| 6,931,382 B2 | 8/2005 | Laage et al. |
| 6,937,976 B2 | 8/2005 | Apte |
| 6,938,020 B2 | 8/2005 | Nakayama |
| 6,938,048 B1 | 8/2005 | Jilk et al. |
| 6,938,156 B2 | 8/2005 | Wheeler et al. |
| RE38,801 E | 9/2005 | Rogers |
| 6,947,897 B2 | 9/2005 | Lortscher et al. |
| 6,947,898 B2 | 9/2005 | Postrel |
| 6,950,826 B1 | 9/2005 | Freeman |
| 6,950,881 B1 | 9/2005 | Ndili |
| 6,950,940 B2 | 9/2005 | Wheeler et al. |
| 6,954,932 B2 | 10/2005 | Nakamura et al. |
| 6,963,857 B1 | 11/2005 | Johnson |
| 6,970,830 B1 | 11/2005 | Samra et al. |
| 6,976,067 B2 | 12/2005 | Gusler et al. |
| 6,978,378 B1 | 12/2005 | Koretz |
| 6,985,879 B2 | 1/2006 | Walker et al. |
| 6,999,938 B1 | 2/2006 | Libman |
| 7,003,476 B1 | 2/2006 | Samra et al. |
| 7,003,565 B2 | 2/2006 | Hind et al. |
| 7,006,979 B1 | 2/2006 | Samra et al. |
| 7,006,983 B1 | 2/2006 | Packes et al. |
| 7,010,495 B1 | 3/2006 | Samra et al. |
| 7,013,286 B1 | 3/2006 | Aggarwal et al. |
| 7,024,374 B1 | 4/2006 | Day et al. |
| 7,039,714 B1 | 5/2006 | Blakley et al. |
| 7,043,455 B1 | 5/2006 | Cuomo et al. |
| 7,047,222 B1 | 5/2006 | Bush |
| 7,051,199 B1 | 5/2006 | Berson et al. |
| 7,051,330 B1 | 5/2006 | Kaler et al. |
| 7,051,929 B2 | 5/2006 | Li |
| 7,069,434 B1 | 6/2006 | Ilnicki et al. |
| 7,072,864 B2 | 7/2006 | Brake, Jr. et al. |
| 7,073,059 B2 | 7/2006 | Worely et al. |
| 7,076,453 B2 | 7/2006 | Jammes et al. |
| 7,080,036 B1 | 7/2006 | Drummond et al. |
| 7,082,532 B1 * | 7/2006 | Vick et al. .............. 713/155 |
| 7,089,203 B1 | 8/2006 | Crookshanks |
| 7,089,585 B1 | 8/2006 | Dharmarajan |
| 7,090,138 B2 | 8/2006 | Rettenmyer et al. |
| 7,092,905 B2 | 8/2006 | Behrenbrinker et al. |
| 7,092,992 B1 | 8/2006 | Yu |
| 7,093,282 B2 | 8/2006 | Hillhouse |
| 7,103,556 B2 | 9/2006 | Del Rey et al. |
| 7,110,962 B2 | 9/2006 | Amon et al. |
| 7,121,471 B2 | 10/2006 | Beenau et al. |
| 7,124,101 B1 | 10/2006 | Mikurak |
| 7,134,075 B2 | 11/2006 | Hind |
| 7,139,686 B1 | 11/2006 | Critz |
| 7,143,063 B2 | 11/2006 | Lent et al. |
| 7,143,174 B2 | 11/2006 | Miller et al. |
| 7,152,242 B2 | 12/2006 | Douglas |
| 7,155,402 B1 | 12/2006 | Dvorak |
| 7,155,477 B2 | 12/2006 | Blair et al. |
| 7,155,614 B2 | 12/2006 | Ellmore |
| 7,161,506 B2 | 1/2007 | Fallon |
| 7,163,153 B2 | 1/2007 | Blossom |
| 7,165,256 B2 | 1/2007 | Boudnik et al. |
| 7,177,830 B2 | 2/2007 | Shields et al. |
| 7,185,094 B2 | 2/2007 | Marquette et al. |
| 7,188,181 B1 * | 3/2007 | Squier et al. .............. 709/228 |
| 7,191,952 B2 | 3/2007 | Blossom |
| 7,195,154 B2 | 3/2007 | Routhenstein |
| 7,197,470 B1 | 3/2007 | Arnett |
| 7,203,909 B1 | 4/2007 | Horvitz et al. |
| 7,225,249 B1 | 5/2007 | Barry |
| 7,225,462 B2 | 5/2007 | Bass et al. |
| 7,225,464 B2 | 5/2007 | Satyavolu et al. |
| 7,228,155 B2 | 6/2007 | Saunders |
| 7,249,097 B2 | 7/2007 | Hutchison et al. |
| 7,249,099 B2 | 7/2007 | Ling |
| 7,249,112 B2 | 7/2007 | Berardi et al. |
| 7,266,835 B2 | 9/2007 | Halbert |
| 7,272,857 B1 | 9/2007 | Everhart |
| 7,299,201 B2 | 11/2007 | Jammes |
| 7,302,585 B1 | 11/2007 | Proudler et al. |
| 7,312,707 B1 | 12/2007 | Bishop et al. |
| 7,313,802 B1 | 12/2007 | Tomsen |
| 7,321,864 B1 | 1/2008 | Gendler |
| 7,333,948 B2 | 2/2008 | Bell et al. |
| 7,340,773 B2 | 3/2008 | Edwards |
| 7,349,866 B2 | 3/2008 | Schwarz |
| 7,353,383 B2 | 4/2008 | Skingle |
| 7,356,516 B2 | 4/2008 | Richey et al. |
| 7,357,331 B2 | 4/2008 | Blossom |
| 7,370,011 B2 | 5/2008 | Bennett |
| 7,389,256 B1 | 6/2008 | Adams et al. |
| 7,395,241 B1 | 7/2008 | Cook et al. |
| 7,400,274 B2 | 7/2008 | Fallon et al. |
| 7,401,025 B1 * | 7/2008 | Lokitz .............. 705/346 |
| 7,417,568 B2 | 8/2008 | Fallon et al. |
| 7,426,530 B1 * | 9/2008 | Rosko et al. .............. 709/201 |
| 7,440,923 B1 | 10/2008 | Compiano |
| 7,444,672 B2 | 10/2008 | Ellmore |
| 7,461,265 B2 | 12/2008 | Ellmore |
| 7,467,096 B2 | 12/2008 | Antonucci et al. |
| 7,472,171 B2 | 12/2008 | Miller et al. |
| 7,480,631 B1 | 1/2009 | Merced et al. |
| 7,485,040 B2 | 2/2009 | Walker et al. |
| 7,490,064 B2 | 2/2009 | Allin et al. |
| 7,493,288 B2 | 2/2009 | Biship et al. |
| 7,493,636 B2 | 2/2009 | Kitsukawa et al. |
| 7,496,950 B2 | 2/2009 | Carley |
| 7,506,804 B2 | 3/2009 | Zajkowski et al. |
| 7,506,806 B2 | 3/2009 | Bonalle et al. |
| 7,512,551 B2 | 3/2009 | Postrel |
| 7,523,385 B2 | 4/2009 | Nguyen et al. |
| 7,539,635 B1 | 5/2009 | Peak et al. |
| 7,545,931 B2 | 6/2009 | Dillaway |
| 7,549,170 B2 | 6/2009 | Stubblefield et al. |
| 7,580,857 B2 | 8/2009 | Vanfleet et al. |
| 7,581,112 B2 | 8/2009 | Brown et al. |
| 7,587,363 B2 | 9/2009 | Cataline et al. |
| 7,599,856 B2 | 10/2009 | Agrawal et al. |
| 7,613,629 B2 | 11/2009 | Antonucci et al. |
| 7,630,935 B2 | 12/2009 | Loeger et al. |
| 7,640,205 B2 | 12/2009 | Michelassi et al. |
| 7,640,321 B2 | 12/2009 | Yabe et al. |
| 7,686,218 B2 | 3/2010 | Hessburg et al. |
| 7,689,504 B2 | 3/2010 | Warren et al. |
| 7,689,506 B2 | 3/2010 | Fei et al. |
| 7,707,089 B1 | 4/2010 | Barton et al. |
| 7,707,111 B2 | 4/2010 | Brake, Jr. et al. |
| 7,729,925 B2 | 6/2010 | Maritzen et al. |
| 7,729,980 B2 | 6/2010 | Mittenzwei et al. |
| 7,747,866 B1 | 6/2010 | Everhart |
| 2001/0002487 A1 | 5/2001 | Grawrock et al. |
| 2001/0011250 A1 | 8/2001 | Paltenghe et al. |
| 2001/0016835 A1 | 8/2001 | Hansmann et al. |
| 2001/0023407 A1 | 9/2001 | Liyanearachchi et al. |
| 2001/0025253 A1 | 9/2001 | Heintz et al. |
| 2001/0027441 A1 | 10/2001 | Wankmueller |
| 2001/0029464 A1 | 10/2001 | Schweitzwer |
| 2001/0029490 A1 | 10/2001 | Inamochi |
| 2001/0032183 A1 | 10/2001 | Landry |
| 2001/0032312 A1 | 10/2001 | Runje et al. |
| 2001/0034651 A1 | 10/2001 | Marks et al. |
| 2001/0034663 A1 | 10/2001 | Teveler et al. |
| 2001/0034718 A1 | 10/2001 | Shaked et al. |
| 2001/0034720 A1 | 10/2001 | Armes |
| 2001/0037243 A1 | 11/2001 | Rouston et al. |
| 2001/0037299 A1 | 11/2001 | Nichols et al. |
| 2001/0038033 A1 | 11/2001 | Habib |
| 2001/0039511 A1 | 11/2001 | Duckworth et al. |
| 2001/0044764 A1 | 11/2001 | Arnold |
| 2001/0047315 A1 | 11/2001 | Siegel |
| 2001/0047342 A1 | 11/2001 | Cuervo |

(56) References Cited

U.S. PATENT DOCUMENTS

| | | |
|---|---|---|
| 2001/0049628 A1 | 12/2001 | Icho |
| 2001/0054059 A1 | 12/2001 | Marks et al. |
| 2001/0055391 A1 | 12/2001 | Jacobs |
| 2002/0002479 A1 | 1/2002 | Almog et al. |
| 2002/0002495 A1 | 1/2002 | Ullman |
| 2002/0002597 A1 | 1/2002 | Morrell |
| 2002/0004742 A1 | 1/2002 | Willcocks et al. |
| 2002/0010621 A1 | 1/2002 | Bell et al. |
| 2002/0010627 A1 | 1/2002 | Lerat |
| 2002/0011517 A1 | 1/2002 | Namekawa et al. |
| 2002/0026365 A1 | 2/2002 | Natanzon |
| 2002/0031230 A1 | 3/2002 | Sweet et al. |
| 2002/0032622 A1 | 3/2002 | Petit et al. |
| 2002/0032642 A1 | 3/2002 | Chichilnisky |
| 2002/0032724 A1 | 3/2002 | Shibusawa et al. |
| 2002/0040344 A1 | 4/2002 | Preiser et al. |
| 2002/0042742 A1 | 4/2002 | Glover et al. |
| 2002/0042774 A1 | 4/2002 | Ortiz et al. |
| 2002/0042808 A1 | 4/2002 | Smith et al. |
| 2002/0046106 A1 | 4/2002 | Ishibashi et al. |
| 2002/0046110 A1 | 4/2002 | Gallagher |
| 2002/0046116 A1 | 4/2002 | Hohle et al. |
| 2002/0049605 A1 | 4/2002 | Hagi |
| 2002/0052778 A1 | 5/2002 | Murphy et al. |
| 2002/0055874 A1 | 5/2002 | Cohen |
| 2002/0059103 A1 | 5/2002 | Anderson et al. |
| 2002/0059345 A1 | 5/2002 | Wang et al. |
| 2002/0062253 A1 | 5/2002 | Dosh et al. |
| 2002/0062257 A1 | 5/2002 | Minamishin et al. |
| 2002/0065735 A1 | 5/2002 | Hatakama et al. |
| 2002/0069104 A1 | 6/2002 | Beach et al. |
| 2002/0069105 A1 | 6/2002 | Botelho et al. |
| 2002/0069109 A1 | 6/2002 | Wendkos |
| 2002/0069158 A1 | 6/2002 | Larkin et al. |
| 2002/0069172 A1 | 6/2002 | Omshehe et al. |
| 2002/0070270 A1 | 6/2002 | Narita et al. |
| 2002/0072931 A1 | 6/2002 | Card |
| 2002/0072974 A1 | 6/2002 | Pugliese et al. |
| 2002/0072984 A1 | 6/2002 | Rothman et al. |
| 2002/0073019 A1 | 6/2002 | Deaton |
| 2002/0077890 A1 | 6/2002 | Lapointe et al. |
| 2002/0077895 A1 | 6/2002 | Howell |
| 2002/0077904 A1 | 6/2002 | Ali |
| 2002/0077964 A1 | 6/2002 | Brody et al. |
| 2002/0077966 A1 | 6/2002 | Harycki et al. |
| 2002/0078382 A1 | 6/2002 | Sheikh et al. |
| 2002/0082920 A1 | 6/2002 | Austin et al. |
| 2002/0082962 A1 | 6/2002 | Farris et al. |
| 2002/0087349 A1 | 7/2002 | Wong |
| 2002/0087471 A1 | 7/2002 | Ganesan et al. |
| 2002/0091567 A1 | 7/2002 | Royston |
| 2002/0099601 A1 | 7/2002 | Farrell |
| 2002/0099649 A1 | 7/2002 | Lee et al. |
| 2002/0099936 A1 | 7/2002 | Kou et al. |
| 2002/0107731 A1 | 8/2002 | Teng |
| 2002/0111859 A1 | 8/2002 | Sheldon et al. |
| 2002/0111860 A1 | 8/2002 | Jones |
| 2002/0111861 A1 | 8/2002 | Sakamoto et al. |
| 2002/0111890 A1 | 8/2002 | Sloan et al. |
| 2002/0111891 A1 | 8/2002 | Hoffman et al. |
| 2002/0116266 A1 | 8/2002 | Marshall |
| 2002/0116331 A1 | 8/2002 | Cataline et al. |
| 2002/0120497 A1 | 8/2002 | King |
| 2002/0120571 A1 | 8/2002 | Maung et al. |
| 2002/0120846 A1 | 8/2002 | Stewart et al. |
| 2002/0123926 A1 | 9/2002 | Bushold et al. |
| 2002/0123946 A1 | 9/2002 | Haworth et al. |
| 2002/0123955 A1 | 9/2002 | Andreski et al. |
| 2002/0128903 A1 | 9/2002 | Kernahan |
| 2002/0128916 A1 | 9/2002 | Beinecke |
| 2002/0128977 A1 | 9/2002 | Nambiar et al. |
| 2002/0133401 A1 | 9/2002 | Mount et al. |
| 2002/0143614 A1 | 10/2002 | Maclean et al. |
| 2002/0143621 A1 | 10/2002 | Donnelly et al. |
| 2002/0143626 A1 | 10/2002 | Voltmer et al. |
| 2002/0143874 A1 | 10/2002 | Marquette et al. |
| 2002/0147633 A1 | 10/2002 | Rafizadeh |
| 2002/0147691 A1 | 10/2002 | Davis et al. |
| 2002/0152116 A1 | 10/2002 | Yan et al. |
| 2002/0152118 A1 | 10/2002 | Hadjigeorgis |
| 2002/0152123 A1 | 10/2002 | Giordano et al. |
| 2002/0152179 A1 | 10/2002 | Racov |
| 2002/0156900 A1 | 10/2002 | Marquette et al. |
| 2002/0161630 A1 | 10/2002 | Kern et al. |
| 2002/0161641 A1 | 10/2002 | Quinlan et al. |
| 2002/0161901 A1* | 10/2002 | Weissman ............... 709/229 |
| 2002/0165808 A1 | 11/2002 | Zamsky et al. |
| 2002/0169671 A1 | 11/2002 | Junger |
| 2002/0174011 A1 | 11/2002 | Sanchez et al. |
| 2002/0178056 A1 | 11/2002 | Lim |
| 2002/0178112 A1 | 11/2002 | Goeller et al. |
| 2002/0178113 A1 | 11/2002 | Clifford et al. |
| 2002/0178213 A1 | 11/2002 | Parry |
| 2002/0184507 A1 | 12/2002 | Makower et al. |
| 2002/0188478 A1 | 12/2002 | Breeland et al. |
| 2002/0188509 A1 | 12/2002 | Ariff et al. |
| 2002/0188511 A1 | 12/2002 | Johnson et al. |
| 2002/0188565 A1 | 12/2002 | Nakamura et al. |
| 2002/0188869 A1 | 12/2002 | Patrick |
| 2002/0191548 A1 | 12/2002 | Ylonen et al. |
| 2002/0194071 A1 | 12/2002 | Yoshizaki et al. |
| 2002/0194119 A1 | 12/2002 | Wright et al. |
| 2002/0198803 A1 | 12/2002 | Rowe |
| 2002/0198806 A1 | 12/2002 | Blagg et al. |
| 2002/0198807 A1 | 12/2002 | Kobayashi et al. |
| 2003/0001888 A1 | 1/2003 | Power |
| 2003/0004794 A1 | 1/2003 | Hamilton |
| 2003/0004803 A1 | 1/2003 | Glover et al. |
| 2003/0004809 A1 | 1/2003 | Palcic et al. |
| 2003/0005288 A1 | 1/2003 | Moskowitz et al. |
| 2003/0009374 A1 | 1/2003 | Moodie et al. |
| 2003/0009379 A1 | 1/2003 | Narasimhan et al. |
| 2003/0009393 A1 | 1/2003 | Norris |
| 2003/0009426 A1 | 1/2003 | Ruiz-Sanchez |
| 2003/0018523 A1 | 1/2003 | Rappaport et al. |
| 2003/0023557 A1 | 1/2003 | Moore |
| 2003/0033252 A1 | 2/2003 | Buttridge et al. |
| 2003/0036952 A1 | 2/2003 | Panttaja et al. |
| 2003/0040964 A1 | 2/2003 | Lacek |
| 2003/0040995 A1 | 2/2003 | Daddario et al. |
| 2003/0041165 A1 | 2/2003 | Spencer et al. |
| 2003/0046173 A1 | 3/2003 | Benjier et al. |
| 2003/0048888 A1 | 3/2003 | Hopper et al. |
| 2003/0050831 A1 | 3/2003 | Klayh |
| 2003/0061093 A1 | 3/2003 | Todd |
| 2003/0061097 A1 | 3/2003 | Walker et al. |
| 2003/0061098 A1 | 3/2003 | Meyer |
| 2003/0061168 A1 | 3/2003 | Routhenstein |
| 2003/0061512 A1* | 3/2003 | Flurry et al. ............... 713/201 |
| 2003/0065618 A1 | 4/2003 | Vandeboe, Jr. |
| 2003/0069808 A1 | 4/2003 | Cardno |
| 2003/0074580 A1 | 4/2003 | Knouse et al. |
| 2003/0083933 A1 | 5/2003 | Mcalear |
| 2003/0083939 A1 | 5/2003 | Wohl |
| 2003/0084002 A1 | 5/2003 | Ericson et al. |
| 2003/0085286 A1 | 5/2003 | Kelley et al. |
| 2003/0088462 A1 | 5/2003 | Carrither et al. |
| 2003/0088470 A1 | 5/2003 | Cuervo |
| 2003/0088489 A1 | 5/2003 | Peters et al. |
| 2003/0097298 A1 | 5/2003 | Klimpl et al. |
| 2003/0097574 A1 | 5/2003 | Upton |
| 2003/0101454 A1 | 5/2003 | Ozer et al. |
| 2003/0105688 A1 | 6/2003 | Brown et al. |
| 2003/0105689 A1 | 6/2003 | Chandak et al. |
| 2003/0115100 A1 | 6/2003 | Teicher |
| 2003/0120544 A1 | 6/2003 | Gritzbach et al. |
| 2003/0125969 A1 | 7/2003 | Kizer et al. |
| 2003/0126011 A1 | 7/2003 | Bryman et al. |
| 2003/0131357 A1 | 7/2003 | Kim |
| 2003/0144902 A1 | 7/2003 | Bowie |
| 2003/0149594 A1 | 8/2003 | Beazley et al. |
| 2003/0149629 A1 | 8/2003 | Claridge et al. |
| 2003/0149756 A1 | 8/2003 | Grieve et al. |
| 2003/0154171 A1 | 8/2003 | Karp et al. |

(56) References Cited

U.S. PATENT DOCUMENTS

| | | |
|---|---|---|
| 2003/0158776 A1 | 8/2003 | Landesmann |
| 2003/0158782 A1 | 8/2003 | Thomson et al. |
| 2003/0158818 A1 | 8/2003 | George et al. |
| 2003/0159072 A1 | 8/2003 | Bellinger et al. |
| 2003/0167199 A1 | 9/2003 | Thomann et al. |
| 2003/0167229 A1 | 9/2003 | Ludwig et al. |
| 2003/0171992 A1 | 9/2003 | Blagg et al. |
| 2003/0182246 A1 | 9/2003 | Johnson et al. |
| 2003/0187787 A1 | 10/2003 | Freund |
| 2003/0195805 A1 | 10/2003 | Storey |
| 2003/0200141 A1 | 10/2003 | Robison |
| 2003/0200142 A1 | 10/2003 | Hicks et al. |
| 2003/0204460 A1 | 10/2003 | Robinson et al. |
| 2003/0205617 A1 | 11/2003 | Allen et al. |
| 2003/0208400 A1 | 11/2003 | Kuo et al. |
| 2003/0208439 A1 | 11/2003 | Rast |
| 2003/0212630 A1 | 11/2003 | Kahr |
| 2003/0212887 A1 | 11/2003 | Walther et al. |
| 2003/0216964 A1 | 11/2003 | Maclean et al. |
| 2003/0216967 A1 | 11/2003 | Williams |
| 2003/0216998 A1 | 11/2003 | Chang et al. |
| 2003/0217003 A1 | 11/2003 | Weinflash et al. |
| 2003/0218066 A1 | 11/2003 | Fernandes et al. |
| 2003/0220834 A1 | 11/2003 | Leung et al. |
| 2003/0225618 A1 | 12/2003 | Hessburg et al. |
| 2003/0225619 A1 | 12/2003 | Dokken et al. |
| 2003/0225688 A1 | 12/2003 | Dobbins |
| 2003/0229590 A1 | 12/2003 | Byrne et al. |
| 2003/0233255 A1 | 12/2003 | Dirienzo |
| 2003/0233278 A1 | 12/2003 | Marshall |
| 2003/0236712 A1 | 12/2003 | Antonucci et al. |
| 2004/0002916 A1 | 1/2004 | Timmerman et al. |
| 2004/0006487 A1 | 1/2004 | Tari |
| 2004/0010447 A1 | 1/2004 | Asayama |
| 2004/0010462 A1 | 1/2004 | Moon et al. |
| 2004/0015394 A1 | 1/2004 | Mok et al. |
| 2004/0019563 A1 | 1/2004 | Sines et al. |
| 2004/0029569 A1 | 2/2004 | Khan et al. |
| 2004/0031856 A1 | 2/2004 | Atsmon et al. |
| 2004/0039686 A1 | 2/2004 | Klebanoff |
| 2004/0039940 A1 | 2/2004 | Cox et al. |
| 2004/0044606 A1 | 3/2004 | Buttridge et al. |
| 2004/0049702 A1 | 3/2004 | Subramaniam et al. |
| 2004/0054931 A1 | 3/2004 | Himmel et al. |
| 2004/0064401 A1 | 4/2004 | Palaghita et al. |
| 2004/0078276 A1 | 4/2004 | Shimogori |
| 2004/0078324 A1 | 4/2004 | Lonnberg et al. |
| 2004/0078328 A1 | 4/2004 | Talbert et al. |
| 2004/0078332 A1 | 4/2004 | Ferguson et al. |
| 2004/0094624 A1 | 5/2004 | Fernandes et al. |
| 2004/0111363 A1 | 6/2004 | Trench et al. |
| 2004/0111371 A1 | 6/2004 | Friedman |
| 2004/0111610 A1 | 6/2004 | Slick et al. |
| 2004/0117658 A1 | 6/2004 | Klaes |
| 2004/0122736 A1 | 6/2004 | Strock et al. |
| 2004/0122766 A1 | 6/2004 | Brooks et al. |
| 2004/0128248 A1 | 7/2004 | Fujihara et al. |
| 2004/0133787 A1 | 7/2004 | Doughty et al. |
| 2004/0138991 A1 | 7/2004 | Song et al. |
| 2004/0143526 A1 | 7/2004 | Monasterio et al. |
| 2004/0146159 A1 | 7/2004 | Rosen |
| 2004/0149544 A1 | 8/2004 | Dal Ferro |
| 2004/0153378 A1 | 8/2004 | Perkowski |
| 2004/0159700 A1 | 8/2004 | Khan et al. |
| 2004/0162773 A1 | 8/2004 | Del Rey et al. |
| 2004/0172358 A1 | 9/2004 | Lent et al. |
| 2004/0177036 A1 | 9/2004 | Nutahara et al. |
| 2004/0181441 A1 | 9/2004 | Fung et al. |
| 2004/0186773 A1 | 9/2004 | George et al. |
| 2004/0193540 A1 | 9/2004 | Brown et al. |
| 2004/0199406 A1 | 10/2004 | Owens et al. |
| 2004/0210498 A1 | 10/2004 | Freund |
| 2004/0210531 A1 | 10/2004 | Barron et al. |
| 2004/0215507 A1 | 10/2004 | Levitt et al. |
| 2004/0215514 A1 | 10/2004 | Quinlan |
| 2004/0225880 A1 | 11/2004 | Mizrah |
| 2004/0230843 A1 | 11/2004 | Jansen |
| 2004/0232223 A1 | 11/2004 | Beenau et al. |
| 2004/0236688 A1 | 11/2004 | Bozeman |
| 2004/0239481 A1 | 12/2004 | Beenau |
| 2004/0243468 A1 | 12/2004 | Cohagan et al. |
| 2004/0243506 A1 | 12/2004 | Das |
| 2004/0249689 A1 | 12/2004 | Naraki et al. |
| 2004/0249710 A1 | 12/2004 | Smith et al. |
| 2004/0249712 A1 | 12/2004 | Brown et al. |
| 2004/0249764 A1 | 12/2004 | Delitz et al. |
| 2004/0252012 A1 | 12/2004 | Beenau et al. |
| 2004/0254991 A1 | 12/2004 | Malik et al. |
| 2005/0004839 A1 | 1/2005 | Bakker et al. |
| 2005/0004864 A1 | 1/2005 | Lent et al. |
| 2005/0006286 A1 | 1/2005 | Fery et al. |
| 2005/0015490 A1 | 1/2005 | Saare et al. |
| 2005/0021363 A1 | 1/2005 | Stimson et al. |
| 2005/0021405 A1 | 1/2005 | Agarwal |
| 2005/0021457 A1 | 1/2005 | Johnson et al. |
| 2005/0023346 A1 | 2/2005 | Bakker et al. |
| 2005/0033619 A1 | 2/2005 | Barnes et al. |
| 2005/0033637 A1 | 2/2005 | Underwood |
| 2005/0035847 A1 | 2/2005 | Bonalle et al. |
| 2005/0040242 A1 | 2/2005 | Beenau et al. |
| 2005/0049965 A1 | 3/2005 | Jen |
| 2005/0055270 A1 | 3/2005 | Broe |
| 2005/0055306 A1 | 3/2005 | Miller et al. |
| 2005/0060579 A1 | 3/2005 | Dickelman et al. |
| 2005/0065877 A1 | 3/2005 | Cleary et al. |
| 2005/0066037 A1 | 3/2005 | Song et al. |
| 2005/0071225 A1 | 3/2005 | Bortolin et al. |
| 2005/0071226 A1 | 3/2005 | Nguyen et al. |
| 2005/0071227 A1 | 3/2005 | Hammad et al. |
| 2005/0071637 A1 | 3/2005 | Shirakawa |
| 2005/0075889 A1 | 4/2005 | Gomes et al. |
| 2005/0077349 A1 | 4/2005 | Bonalle et al. |
| 2005/0080672 A1 | 4/2005 | Courtion et al. |
| 2005/0086103 A1 | 4/2005 | Agura et al. |
| 2005/0086166 A1 | 4/2005 | Monk et al. |
| 2005/0091104 A1 | 4/2005 | Abraham |
| 2005/0091126 A1 | 4/2005 | Junger |
| 2005/0091138 A1 | 4/2005 | Awatsu |
| 2005/0091492 A1 | 4/2005 | Benson et al. |
| 2005/0096976 A1 | 5/2005 | Nelms |
| 2005/0097033 A1 | 5/2005 | Pretell et al. |
| 2005/0102178 A1 | 5/2005 | Phillips et al. |
| 2005/0108090 A1 | 5/2005 | Takeda et al. |
| 2005/0108102 A1 | 5/2005 | York |
| 2005/0108151 A1 | 5/2005 | York |
| 2005/0114254 A1 | 5/2005 | Condie |
| 2005/0116024 A1 | 6/2005 | Beenau et al. |
| 2005/0119938 A1 | 6/2005 | Smith et al. |
| 2005/0125292 A1 | 6/2005 | Kassab et al. |
| 2005/0125295 A1 | 6/2005 | Tidwell et al. |
| 2005/0125296 A1 | 6/2005 | Tidwell et al. |
| 2005/0125315 A1 | 6/2005 | Munoz et al. |
| 2005/0125337 A1 | 6/2005 | Tidwell et al. |
| 2005/0125338 A1 | 6/2005 | Tidwell et al. |
| 2005/0125339 A1 | 6/2005 | Tidwell et al. |
| 2005/0125350 A1 | 6/2005 | Tidwell et al. |
| 2005/0125351 A1 | 6/2005 | Tidwell et al. |
| 2005/0125360 A1 | 6/2005 | Tidwell et al. |
| 2005/0131721 A1 | 6/2005 | Doctorow et al. |
| 2005/0131761 A1 | 6/2005 | Trika et al. |
| 2005/0131792 A1 | 6/2005 | Rowe |
| 2005/0137982 A1 | 6/2005 | Michelassi et al. |
| 2005/0144071 A1 | 6/2005 | Monahan et al. |
| 2005/0144074 A1 | 6/2005 | Fredregill et al. |
| 2005/0144105 A1 | 6/2005 | Czyzewski |
| 2005/0144143 A1 | 6/2005 | Freiberg |
| 2005/0149386 A1 | 7/2005 | Agura et al. |
| 2005/0149393 A1 | 7/2005 | Leof |
| 2005/0149440 A1 | 7/2005 | Michelassi et al. |
| 2005/0154664 A1 | 7/2005 | Guy et al. |
| 2005/0159986 A1 | 7/2005 | Breeland et al. |
| 2005/0160003 A1 | 7/2005 | Berardi et al. |
| 2005/0160051 A1 | 7/2005 | Johnson |
| 2005/0167342 A1 | 8/2005 | Vullriede et al. |

(56) References Cited

U.S. PATENT DOCUMENTS

| | | |
|---|---|---|
| 2005/0171839 A1 | 8/2005 | Corriere |
| 2005/0171842 A1 | 8/2005 | Tien et al. |
| 2005/0171898 A1 | 8/2005 | Bishop et al. |
| 2005/0171901 A1 | 8/2005 | Rosenblatt et al. |
| 2005/0177503 A1 | 8/2005 | Thomas |
| 2005/0177523 A1 | 8/2005 | Weiss et al. |
| 2005/0182654 A1 | 8/2005 | Abolfathi et al. |
| 2005/0182735 A1 | 8/2005 | Zager et al. |
| 2005/0187820 A1 | 8/2005 | Mohan |
| 2005/0192862 A1 | 9/2005 | Modi |
| 2005/0193056 A1 | 9/2005 | Schaefer et al. |
| 2005/0193208 A1 | 9/2005 | Charrette et al. |
| 2005/0197904 A1 | 9/2005 | Baron et al. |
| 2005/0198634 A1 | 9/2005 | Nielsen et al. |
| 2005/0199708 A1 | 9/2005 | Friedman |
| 2005/0203824 A1 | 9/2005 | Freud et al. |
| 2005/0203857 A1 | 9/2005 | Friedman |
| 2005/0205666 A1 | 9/2005 | Ward et al. |
| 2005/0206499 A1 | 9/2005 | Fisher |
| 2005/0209917 A1 | 9/2005 | Anderson et al. |
| 2005/0216346 A1 | 9/2005 | Kusumoto et al. |
| 2005/0216421 A1 | 9/2005 | Barry et al. |
| 2005/0222906 A1 | 10/2005 | Chen |
| 2005/0234769 A1 | 10/2005 | Jain et al. |
| 2005/0234773 A1 | 10/2005 | Hirst et al. |
| 2005/0234789 A1 | 10/2005 | Czyzewski et al. |
| 2005/0240474 A1 | 10/2005 | Li |
| 2005/0240477 A1 | 10/2005 | Friday et al. |
| 2005/0240916 A1 | 10/2005 | Sandrew |
| 2005/0242179 A1 | 11/2005 | Warwick |
| 2005/0246289 A1 | 11/2005 | Alexander et al. |
| 2005/0246627 A1 | 11/2005 | Sayed |
| 2005/0251446 A1 | 11/2005 | Jiang et al. |
| 2005/0251470 A1 | 11/2005 | Sullivan |
| 2005/0256794 A1 | 11/2005 | Colby |
| 2005/0256802 A1 | 11/2005 | Ammermann et al. |
| 2005/0261916 A1 | 11/2005 | Mccall et al. |
| 2005/0261995 A1 | 11/2005 | Phelan |
| 2005/0267800 A1 | 12/2005 | Tietzen et al. |
| 2005/0273386 A1 | 12/2005 | Weidner |
| 2005/0273387 A1 | 12/2005 | Previdi |
| 2005/0273425 A1 | 12/2005 | Yamazaki |
| 2005/0278215 A1 | 12/2005 | Seele, Jr. |
| 2005/0283429 A1 | 12/2005 | Bates et al. |
| 2005/0288998 A1 | 12/2005 | Verma et al. |
| 2005/0289003 A1 | 12/2005 | Thompson et al. |
| 2005/0289051 A1 | 12/2005 | Allin et al. |
| 2006/0004629 A1 | 1/2006 | Neemann et al. |
| 2006/0005039 A1 | 1/2006 | Hsieh |
| 2006/0010033 A1 | 1/2006 | Thomas |
| 2006/0010034 A1 | 1/2006 | Sparks |
| 2006/0011719 A1 | 1/2006 | Lehtonen et al. |
| 2006/0015463 A1 | 1/2006 | Gupta et al. |
| 2006/0020507 A1 | 1/2006 | Sagey |
| 2006/0020783 A1 | 1/2006 | Fisher |
| 2006/0026073 A1 | 2/2006 | Kenny et al. |
| 2006/0029261 A1 | 2/2006 | Hoffman et al. |
| 2006/0031718 A1 | 2/2006 | Thornhill et al. |
| 2006/0036553 A1 | 2/2006 | Gupta et al. |
| 2006/0041540 A1 | 2/2006 | Shannon |
| 2006/0053056 A1 | 3/2006 | Alspach-Goss et al. |
| 2006/0064329 A1 | 3/2006 | Abolfathi et al. |
| 2006/0080230 A1 | 4/2006 | Freiberg |
| 2006/0080243 A1 | 4/2006 | Kemper et al. |
| 2006/0080254 A1 | 4/2006 | Chigira et al. |
| 2006/0095350 A1 | 5/2006 | Hall et al. |
| 2006/0116949 A1 | 6/2006 | Wehunt et al. |
| 2006/0122943 A1 | 6/2006 | Mann et al. |
| 2006/0143077 A1 | 6/2006 | Prorock |
| 2006/0143117 A1 | 6/2006 | Chigira et al. |
| 2006/0149671 A1 | 7/2006 | Nix et al. |
| 2006/0161478 A1 | 7/2006 | Turner et al. |
| 2006/0173706 A1 | 8/2006 | Allin et al. |
| 2006/0249574 A1 | 11/2006 | Brown et al. |
| 2006/0259766 A1 | 11/2006 | Rasti |
| 2006/0261927 A1 | 11/2006 | Kelly et al. |
| 2006/0271397 A1 | 11/2006 | Allin et al. |
| 2006/0271477 A1 | 11/2006 | Allin et al. |
| 2006/0271478 A1 | 11/2006 | Allin et al. |
| 2006/0271479 A1 | 11/2006 | Allin et al. |
| 2006/0271480 A1 | 11/2006 | Allin et al. |
| 2006/0274970 A1 | 12/2006 | Seki et al. |
| 2007/0011089 A1 | 1/2007 | DeSchryver |
| 2007/0019806 A1 | 1/2007 | Conley et al. |
| 2007/0034700 A1 | 2/2007 | Poidomani et al. |
| 2007/0043681 A1 | 2/2007 | Morgan et al. |
| 2007/0078771 A1 | 4/2007 | Allin et al. |
| 2007/0088950 A1 | 4/2007 | Wheeler et al. |
| 2007/0136211 A1 | 6/2007 | Brown et al. |
| 2007/0156521 A1 | 7/2007 | Yates |
| 2007/0179883 A1 | 8/2007 | Questembert |
| 2007/0186252 A1 | 8/2007 | Maggio |
| 2007/0192618 A1 | 8/2007 | Ellmore |
| 2007/0203850 A1 | 8/2007 | Singh et al. |
| 2007/0208671 A1 | 9/2007 | Brown et al. |
| 2007/0215688 A1 | 9/2007 | Routhenstein |
| 2007/0234408 A1 | 10/2007 | Burch et al. |
| 2007/0234409 A1 | 10/2007 | Eisen |
| 2007/0265924 A1 | 11/2007 | Schwarz |
| 2007/0283436 A1 | 12/2007 | Duffield et al. |
| 2007/0295803 A1 | 12/2007 | Levine et al. |
| 2008/0010202 A1 | 1/2008 | Schwarz |
| 2008/0133350 A1 | 6/2008 | White et al. |
| 2008/0184315 A1 | 7/2008 | Ellis et al. |
| 2008/0262915 A1 | 10/2008 | Gojkovic et al. |
| 2008/0320567 A1 | 12/2008 | Shulman et al. |
| 2009/0043651 A1 | 2/2009 | Schwarz |
| 2009/0100508 A1 | 4/2009 | Labaton |
| 2009/0112639 A1 | 4/2009 | Beaver |
| 2009/0150937 A1 | 6/2009 | Ellis et al. |
| 2009/0171778 A1 | 7/2009 | Powell |
| 2009/0192940 A1 | 7/2009 | Mann et al. |
| 2009/0228362 A1 | 9/2009 | Lapsley et al. |
| 2009/0271853 A1 | 10/2009 | Everhart |
| 2009/0313110 A1 | 12/2009 | Asai et al. |
| 2010/0057551 A1 | 3/2010 | Blaisdell |
| 2010/0057553 A1 | 3/2010 | Ameiss et al. |

FOREIGN PATENT DOCUMENTS

| | | |
|---|---|---|
| EP | 1089516 | 4/2001 |
| JP | 359146347 | 8/1984 |
| JP | 10187467 | 7/1998 |
| JP | 11078891 | 3/1999 |
| WO | WO 98/10368 | 3/1998 |
| WO | WO 98/29822 | 7/1998 |
| WO | WO 99/39291 | 8/1999 |
| WO | WO 01/11526 | 2/2001 |
| WO | WO 01/88659 | 11/2001 |
| WO | WO 2005/101975 | 11/2005 |
| WO | WO 2006/011904 | 2/2006 |
| WO | WO 2006/060370 | 6/2006 |
| WO | WO 2006/105092 | 10/2006 |
| WO | WO 2006/116772 | 11/2006 |

OTHER PUBLICATIONS

Anonymous, CNBC On MSN Money; Microsoft Money 2003 Deluxe, Reviewer's Guide, Aug. 2002.

Brown, Keith, The Builders Revolution (1998).

Butterworth, 'Automating the Business Process of Mission Critical Distributed Applications'; Forte Software, Inc.; Apr. 1997.

Calyx Software, Point for Windows Version 3.x Interface Marketing Guide, Rev. Dec. 8, 1999, Copyright 1999.

Definition of 'Opt Out', Wiktionary, (http://en.wiktionary.org/wild/opt_out), Aug. 18, 2008 (1 page).

Hasting et al., A Case Study of Authenticated and Secure File Transfer The Iowa Campaign Finance Reporting System (1997).

Kilian-Kehr, Mobile Security with Smartcards, Dissertation, Apr. 8, 2002.

Kristol, HTTP Cookies Standards, Privacy, and Politics, ACM Transactions on Internet Technology, vol. 1, No. 2, p. 151-198, Nov. 2001.

(56) References Cited

OTHER PUBLICATIONS

Li, et al., Combined Coherence and Prefetching Mechanisms for Effective Web Caching, IEEE, p. 3034-3038, 2001.
Microsoft, CNBC On MSN Money Microsoft Money 2003 Deluxe (2003).
Muse Technologies, Leading the New Age of Perceptual Computing, Apr. 26, 1999.
Myers, The Wired World of Investment Information, Nation's Business, Washington, vol. 85, Iss. 3, p. 58, Mar. 1997.
Nelte et al., Cookies Weaving the Web into a State, Crossroads, vol. 7, Issue 1, ACM Press, 6 pages (2000).
Primavera Expedition User Guide (1998).
"Servlet/Applet/HTML Authentication Process with Single Sign-on;" IBM Technical Disclosure Bulletin; Jan. 2000.
Van Collie, Shimon Craig, Problem Disbursement Control Needed Construction Loan Tool from PriMerit NewTrend, Apr. 1990.
Yee, Using Secure Coprocessors, May 1994.
Youll, Peer to Peer Transactions in Agent Mediated Electronic Commerce, Aug. 10, 2001.

\* cited by examiner

SYSTEM AND METHOD FOR SINGLE SESSION SIGN-ON

RELATED APPLICATIONS

This application is a continuation of U.S. application Ser. No. 10/026,403, filed Dec. 21, 2001, entitled "SYSTEM AND METHOD FOR SINGLE SESSION SIGN-ON" to Miller (now U.S. Pat. No. 7,987,501), which claims priority to U.S. Provisional Patent Application Ser. No. 60/338,359, filed Dec. 4, 2001, entitled "SYSTEM AND METHOD FOR SINGLE SESSION SIGN-ON." The entire disclosures of all of the foregoing applications are hereby incorporated by reference.

BACKGROUND

1. Field of the Invention

The present invention relates to authentication or credentials for access control of protected resources, and more particularly to the use of credentials or authentication granted by one system as a basis for granting credentials or authentication on another system.

2. Description of the Related Art

As known in the art, it is possible to have session credentials to control or limit access to protected resources. In a networked system, this technique is commonly used when a client computer attempts to gain access to protected resources that are held or accessible through a server. These credentials or authentication are typically granted to the client for the duration of a session. The session may be defined by the length of time that a browser application on the client computer is open, or it may be defined by the shorter of a specific period of time, and the length of time that the browser application is open. A session may also last for a longer time than the browser application is open.

Once the session is over, the credential or authentication is no longer valid and the client user must re-establish their credentials or authentication in order for them to again have access to the protected resources of the server.

A problem arises when the client wants access to protected resources on different servers of a system during the same session. Without some mechanism for sharing of credentials or authentication between the servers, the client user must establish credentials with each server. To overcome this problem, single sign-on systems have been developed. While these single sign-on systems eliminate most or all of the necessity for a client user to authenticate on each system, they do not readily scale or bridge across different systems. One technique for bridging across different systems is to have a shared vault for authentication or credentials that is available to both systems. However, this approach requires a great deal of coordination between the systems, and necessarily requires some cross-system access.

Another approach is to have some form of shared secret keys or set of public keys used by the two systems, which allows one system to prove its' identity to the other by encrypting or signing a request and passing it through the client browser to the second system (typically this is done through a "cooked URL" or CURL.)

What is needed is a method and system to support cross-system authentication and credentialing, while maintaining the advantages of single system authentication and credentialing.

SUMMARY OF THE INVENTION

In one embodiment, the invention provides a method and system for validating credentials by determining at a first system that a client does not have a valid session credential for the first system, then retrieving at the first system, information from a session token (e.g. a cookie) held by the client, which corresponds to a possible session credential for the second system. At least some of the information from the session token is presented to the second system, and the second system determines whether the client has a valid session credential.

In another embodiment, the invention provides a method and system for establishing session credentials by determining that a client does not have a valid session credential for a first or a second system. In this embodiment, the system sends a log in page from the first system to the client, and receives log in information from the client. The system sends from the first system to the second system, the log in information, and receives, at the first system, information corresponding to a session credential for the second system, the session credential granted by the second system based at least in part on the log in information.

In another embodiment, the invention provides a method and system for establishing session credentials by determining that a client does not have a valid session credential for a first or a second system. In this embodiment, the system sends a log in page from the second system to the client, and receives log in information from the client. The system sends from the second system to the first system, information corresponding to a session credential for the second system, where the session credential granted by the second system is based at least in part on the log in information, and grants a session credential for the first system.

The foregoing specific aspects and advantages of the invention are illustrative of those which can be achieved by the present invention and are not intended to be exhaustive or limiting of the possible advantages that can be realized. Thus, the aspects and advantages of this invention will be apparent from the description herein or can be learned from practicing the invention, both as embodied herein and as modified in view of any variations that may be apparent to those skilled in the art. Accordingly the present invention resides in the novel parts, constructions, arrangements, combinations and improvements herein shown and described.

BRIEF DESCRIPTION OF THE DRAWINGS

The foregoing features and other aspects of the invention are explained in the following description taken in conjunction with the accompanying figures wherein.

It is understood that the drawings are for illustration only and are not limiting.

DETAILED DESCRIPTION OF THE DRAWINGS

Figure 1:
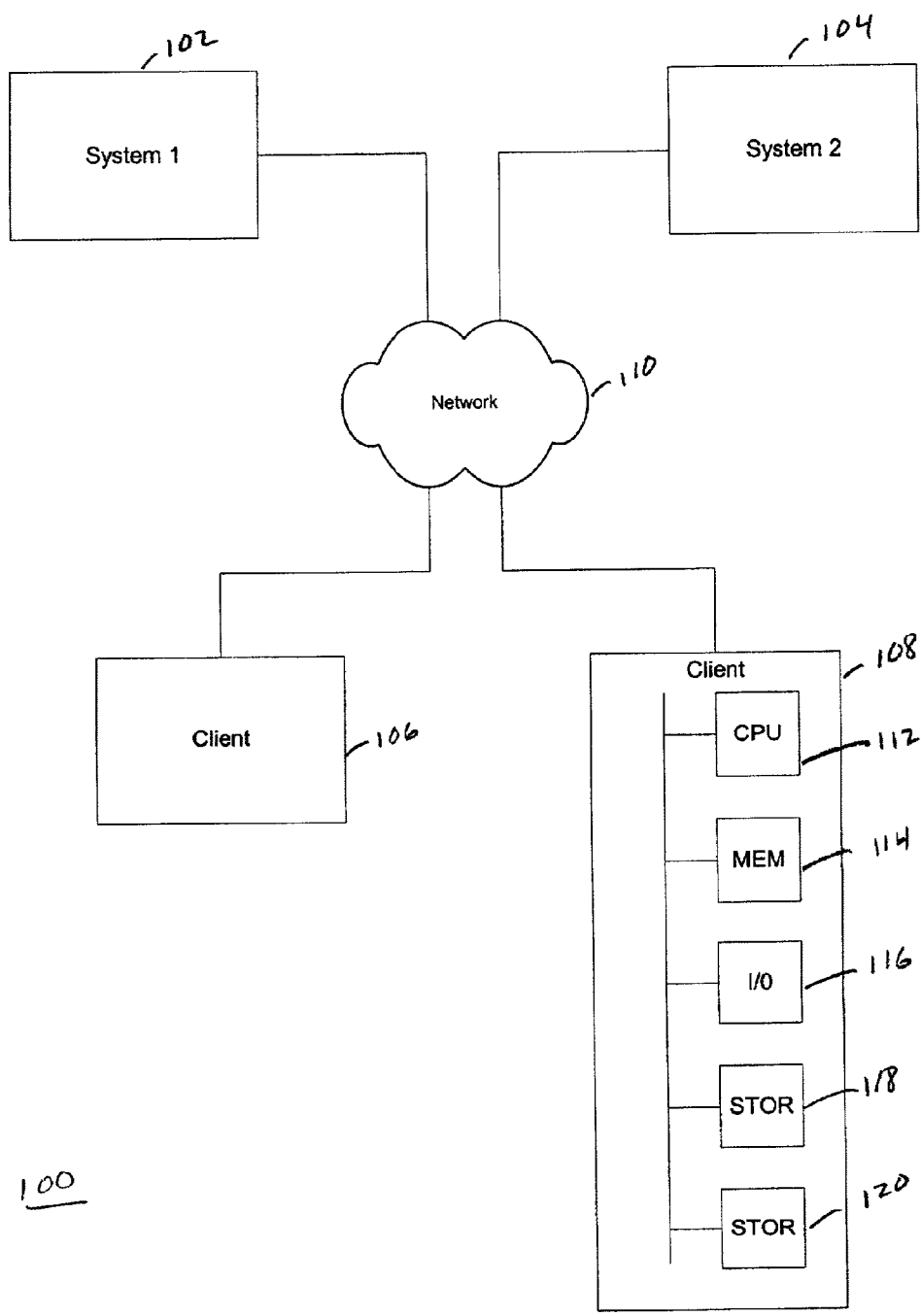
FIG. 1 illustrates elements of a system according to one embodiment of the invention.

Referring to FIG. 1 as an example, overall system 100 of the invention includes at least two separate systems 102, 104, each system with some form of protected resource. Overall system 100 also includes at least one individual client, with two clients illustrated as 106, 108 and a network 110 such as the Internet. Systems 102, 104 and clients 106, 108 may be individual computers, or networked computers. Although illustrated for only one computer, typically, each of the computers of systems 102, 104 and clients 106, 108 includes a central processor 112, memory 114, input and output devices 116, fixed storage media 118 and removable storage media 120.

Clients 106, 108 run operating system software and application software. In one embodiment, with network 110 used to connect systems 102, 104 and clients 106, 108, Internet browser software, such as INTERNET EXPLORER or NETSCAPE are also run by clients 106, 108. Similarly, systems 102, 104 also run operating system software and application software. As indicated above, systems 102, 104 also include protected resources, frequently in the form of data stored as databases, and to support those resources, systems 102, 104 run server software and other software commonly associated with servers. To support the web sites that provide access to the protected resources, systems 102, 104 also run web server applications, such as: NETFUSION, EPICENTRIC, VIGNETTE, PEOPLESOFT, BEA WEBLOGIC PORTAL, or custom-developed enterprise applications such as the MorganMarkets website at JPMorgan, the JPMorgan Express Online application, etc.).

The protected resources of systems 102, 104 may include sensitive business information that is restricted to particular individuals or groups, or the protected resources may be subscription or pay-per-use. Credentials are also important for personalization. The protected resources of systems 102, 104 are stored on individual or multiple servers, which are not illustrated. Users of clients 106, 108 will want access to the protected resources of systems 102, 104, but to protect the resources of systems 102, 104, users or clients 106, 108 are first authenticated before they can gain access.

The authentication process usually includes a log in process where the user enters a user name and password. That user name and password is checked against a database and if valid, the user is allowed access to the protected resources.

Examples of commonly known authentication and credentialing software packages used by systems 102, 104 include GETACCESS and TRUEPASS by Entrust, SITEMINDER by Netegrity, and IBM Policy Director. However, these software packages do not readily support cross-system authentication and credentialing.

Internet Browser Cookies

As part of the network and application protocols used by systems 102, 104, and clients 106, 108, it is common for cookies to be passed between systems 102, 104 and clients 106, 108. Because cookies and their uses can be an aspect of some embodiments of the invention, it is helpful to spend some time generally explaining what cookies are and how they work.

A cookie is a small piece of data that consists of a text-only string. It has provisions to include the domain, path, lifetime and value of a variable that the website (e.g., systems 102, 104) sets. A cookie is an HTTP header that is typically sent from a server to a client and then may be sent from the client back to the server. Accordingly, some knowledge of HTTP, which can be found in RFC 2109, is helpful.

A cookie may contain six (6) parameters that can be passed. These are: 1) the name of the cookie; 2) the value of the cookie; 3) the expiration date of the cookie; 4) the path the cookie is valid for; 5) the domain the cookie is valid for; and 6) the need for a secure connection to exist to use the cookie. Of these six parameters, two parameters (the name and its value) are mandatory. The other four parameters are set either explicitly or by default.

An example of a cookie that might be sent from a server (e.g., system 102, 104) to a client (e.g., 106, 108) is:
Content-Type: text/html
Set-Cookie: foo=bar; path=/promo; domain=www.myserver.com; expires Mon, 09-Dec-2002 13:46:00 GMT The name and value parameters of a cookie are mandatory and are set by simply pairing them as in name=value. In the example above, the name parameter is foo, and the value is bar.

The path parameter sets the URL path the cookie is valid within. If there is no path parameter, the value defaults to the URL path of the document creating the cookie. Regardless of whether the server explicitly sets the path parameter, or the parameter is set by default, any web pages outside the path cannot read or use the cookie. The path parameter can have significant security and privacy implications and helps to ensure that cookies are not readily available except to the intended servers. In the example above, the path is /promo, and the cookie is only valid for web pages or documents on that path.

The domain parameter sets the domain that is allowed to access the cookie, and a server issuing a cookie must be a member of the domain that it tries to set in the cookie. Unless explicitly set, the domain parameter defaults to the full domain of the web page or document that sets the cookie. As examples, a server in the domain www.myserver.com cannot set a cookie for the domain .yourserver.com. However, a server in the domain www.yourserver.myserver.com can set a cookie for the domain .myserver.com. As discussed in greater detail below, this is important for some aspects of the invention. In the example above, the domain parameter is www-.myserver.com.

The expires parameter determines the length of time the cookie is valid. If the server does not explicitly set the expires parameter, it defaults to the end of session. Depending on the particular browser, this normally means that the cookie does not remain in any form of data storage after the browser session is complete, and for most browsers, it means that the cookie is held primarily or entirely within volatile memory and as soon as the browser application closes on the client, the cookie is forever lost. For most browsers (including NETSCAPE and INTERNET EXPLORER), setting the expires parameter causes the browser to store the cookie on disk, not only to hold it in volatile memory. In the example above, the cookie expires on Monday, Dec. 9, 2002 at 13:46:00 GMT.

Depending on whether or not there is an expires parameter for a cookie, and the date of that parameter, it will be retained only in the volatile memory of clients 106, 108 and within memory allocated to the browser while the browser is running, or the browser may write the cookie to non-volatile storage or disk so that it is available even after the browser application is closed or stopped.

Cookies provide a way for a server to maintain state using HTTP, which is otherwise a stateless protocol, thereby avoiding the need for a client user to continuously re-identify themselves to a server, or authenticate themselves so as to gain access to protected resources of the server. For example, when a client user initially connects over the Internet or an Intranet to a server that has protected resources, and the client computer is using a browser application running on the client computer, the user may be asked to authenticate themselves through a log on page. The server is able to keep track of which users have previously logged on or authenticated themselves by checking for a cookie on the client browser. If the server knows what cookies have been set on clients and has a way to verify that a cookie returned by a client is valid, then the server can be reasonably assured that if a client returns a valid cookie, the client can safely be granted further or continued access to the protected resources. There are many ways for a server to ensure that a cookie is valid and that the intended user is using the client computer. One such way is to encode, encrypt or hash the cookie value and to set the expires parameter to a short period of time, such as a few minutes. Then, as the user accesses different web pages, the server periodically updates the expires parameter of the cookie. This has the effect of maintaining a valid cookie and avoiding the need for the user to re-authenticate themselves, but at the same time helps to ensure that a different user of the client computer will not be able to access the servers' protected resources should the first and authenticated user happen to walk away from the client computer without terminating the browser application or logging out. However, most systems do not periodically reset the cookie to update the expires parameter. In most systems, the cookie is set once at session startup, either without specifying an expires parameter (in which case the cookie will only last the lifetime the browser is open) or specifying an expires parameter longer than the maximum lifetime of the session. The actual session expiration is typically handled by the server, which maintains a session record for the user, and includes total session lifetime, activity timeout information, and other session state.

The description of cookies that is provided above is not intended to be full or complete, but is provided to assist those of ordinary skill in understanding certain aspects of the invention. There are many sources of information on cookies, one of which can be found at http://www.cookiecentral.com/faq.

An Example Method

Figure 2:
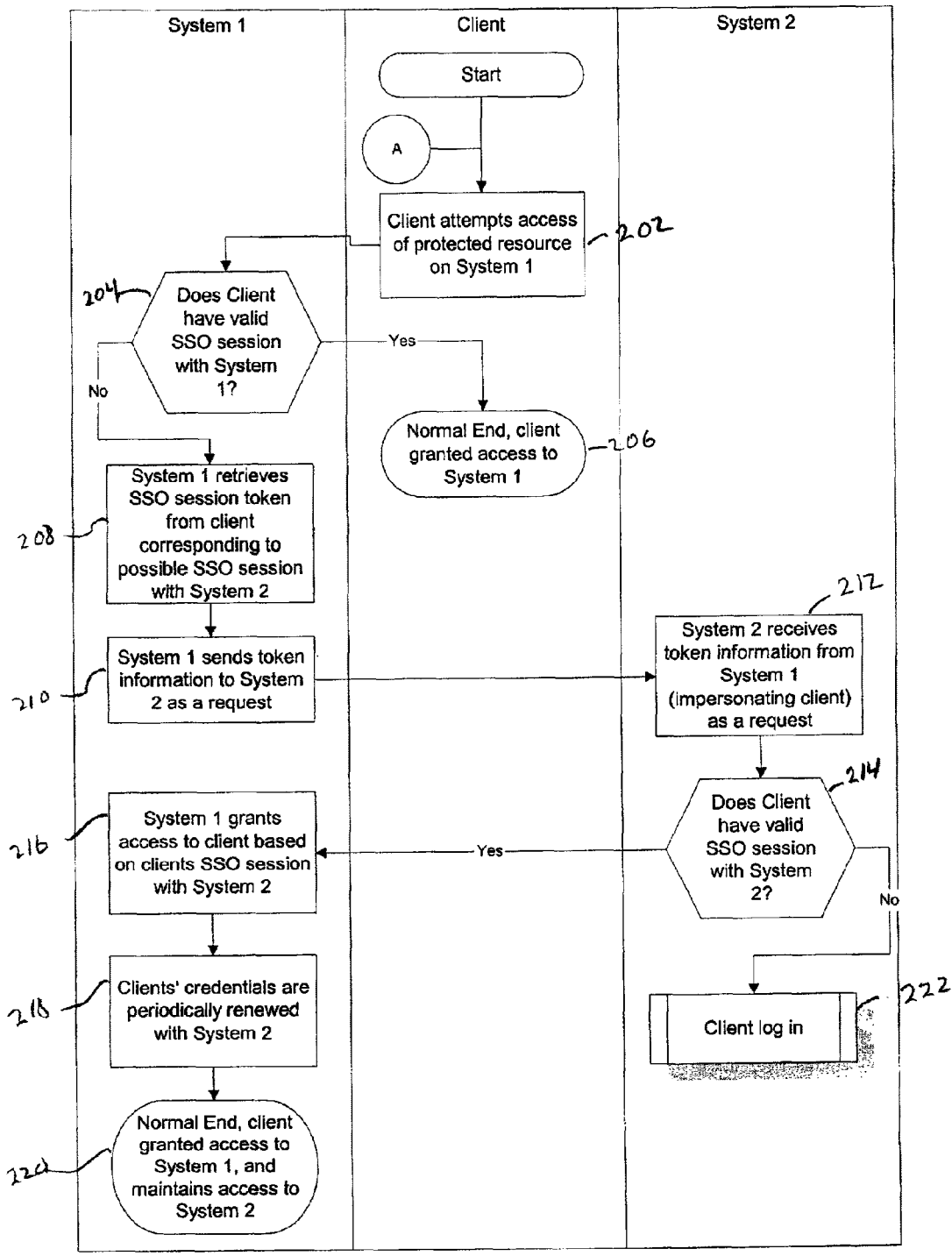
FIG. 2 illustrates steps in a method according to one embodiment of the invention.

Referring now to FIGS. 1 and 2, a method of an embodiment of the invention begins at step 202 when a client (e.g., 106, 108) attempts to access a protected resource on system 1 (102).

At step 204, system 1 (102) determines whether the client has a valid single sign-on (SSO) session.

If the client has a valid SSO session, then at step 206, the client is granted access to the protected resource(s) of system 1 (102), and the method ends.

If, at step 204, it is determined that the client does not have a valid SSO session, then at step 208, system 1 (102) retrieves an SSO session token from the client. The token corresponds to a possible SSO session that the client has with another system (104). When the method of the invention is used with a web based application and browser, the token is the same as or similar to a cookie. When the method of the invention is used with systems other than the Internet and web based applications, the token is a piece of data or information that provides authentication or credentials of the client with system 2.

At step 210, after retrieving the token from the client, system 1 (102) sends the token or information extracted from the token to system 2 (104) as a request. In this step, system 1 (102) impersonates the client to system 2 (104).

At step 212, system 2 (104) receives the token or information extracted from the token.

At step 214, system 2 (104) determines whether the client (108) has a valid SSO session with system 2.

If at step 214, system 2 determines that the client has a valid SSO session, then at step 216, that information is communicated to system 1 (which is impersonating the client), and system 1 grants access to the client based on the clients' SSO session with system 2.

At step 218, the client's SSO session credentials with system 2 are periodically renewed. This renewal may be performed by system 1, system 2 or the client.

At step 220, the client has access to the protected resources of system 1 (102), as well as an SSO session with system 2 (104).

If at step 214, system 2 determines that the client does not have a valid SSO session, then at step 222, the client is provided an opportunity to log in. A previously valid session may become invalid if a timer has expired. In this case, if there is a cryptographic key associated with the cookie or token the key may be valid, but the cookie or token may have expired. One embodiment of the steps for client log in that are summarized at step 222 of FIG. 2 are more fully illustrated in FIG. 3 and described below.

Figure 3:
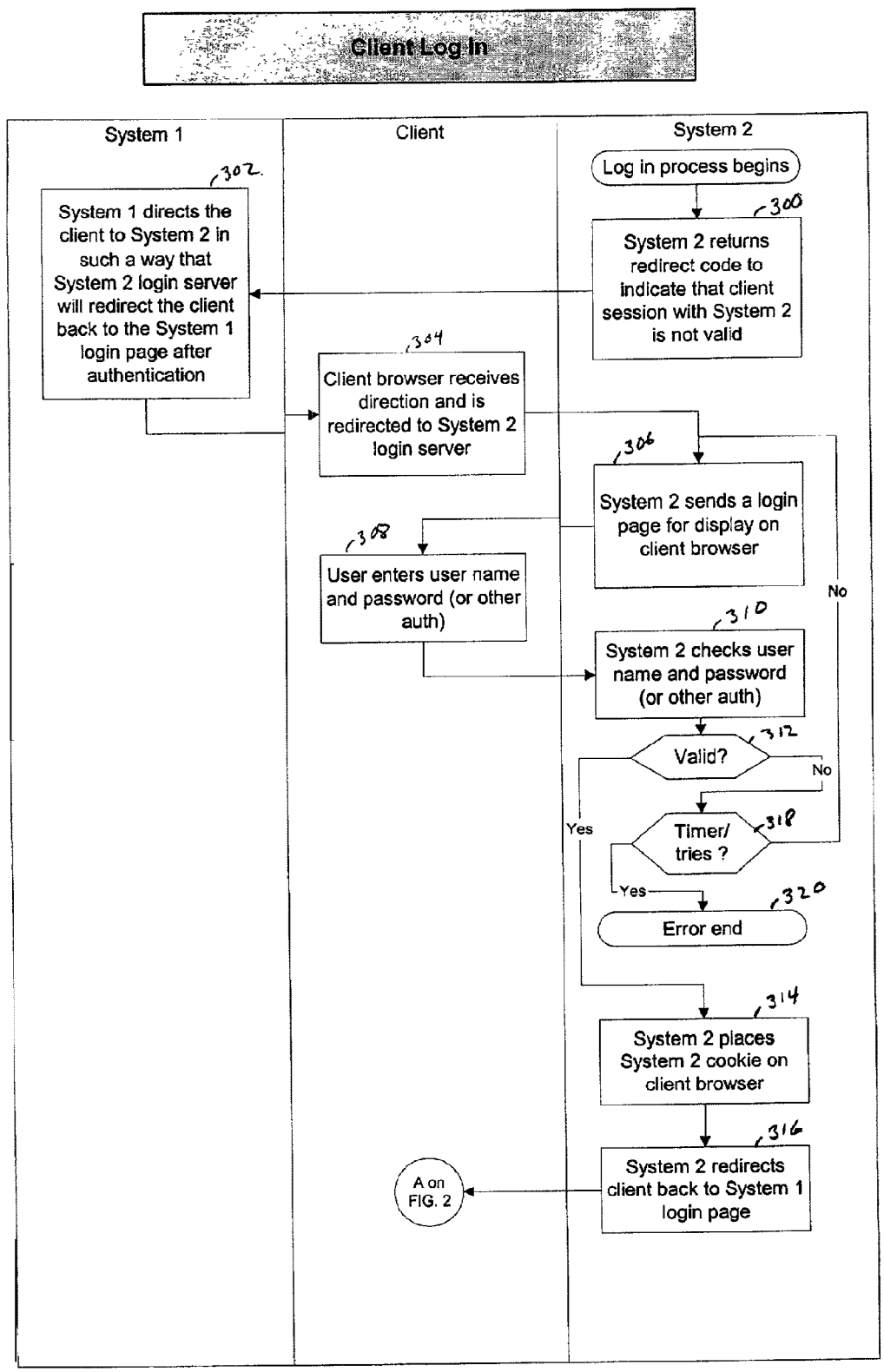
FIG. 3 illustrates steps in a method according to one embodiment of the invention.

Referring now to FIGS. 1 and 3, at step 300, system 2 (104) returns a redirect code to indicate that the client's session with system 2 is not valid. System 2 (104) sends this redirect code to system 1 (102).

At step 302, after receiving the redirect code, system 1 (102) directs the client to system 2 (104) in such a way that the system 2 log in server will redirect the client back to the system 1 log in page after authentication. In one embodiment this is done using a URL, such as https://www.yourserver.com/login?from=www.myserver.com. This example will redirect the client to www.yourserver.com and tell the client to go back to www.myserver.com. There are other ways this can be written.

At step 304, the client receives the direction from system 1 and is redirected to the system 2 log in server.

At step 306, system 2 sends a log in page for display on the client browser. The log in page may be for system 1, system 2 or a custom page.

At step 308, the client user enters their name and password, or provides some other form of identification or authentication, such as a SECURID card or token available from RSA, biometrics, smartcard, etc.

At steps 310 and 312, system 2 checks the validity of the name and password or authentication of the client user.

If the name and password or authentication of the client user is valid, then at step 314, system 2 places a cookie or session token on the client browser. Then, at step 316, system 2 redirects the client back to system 1 (step 202 of FIG. 2). On this subsequent attempt of the client to access the protected resources of system 1, beginning at step 202 of FIG. 2, system 2 will find a valid SSO session at step 214, and system 1 can then grant the client access to the protected resources at step 216.

If at step 312, the name and password or authentication of the client is not valid, then at step 318, system 2 determines whether the client is allowed another attempt to authenticate, and if so, returns to step 306. Otherwise, the client is denied access at step 320.

Figure 4:
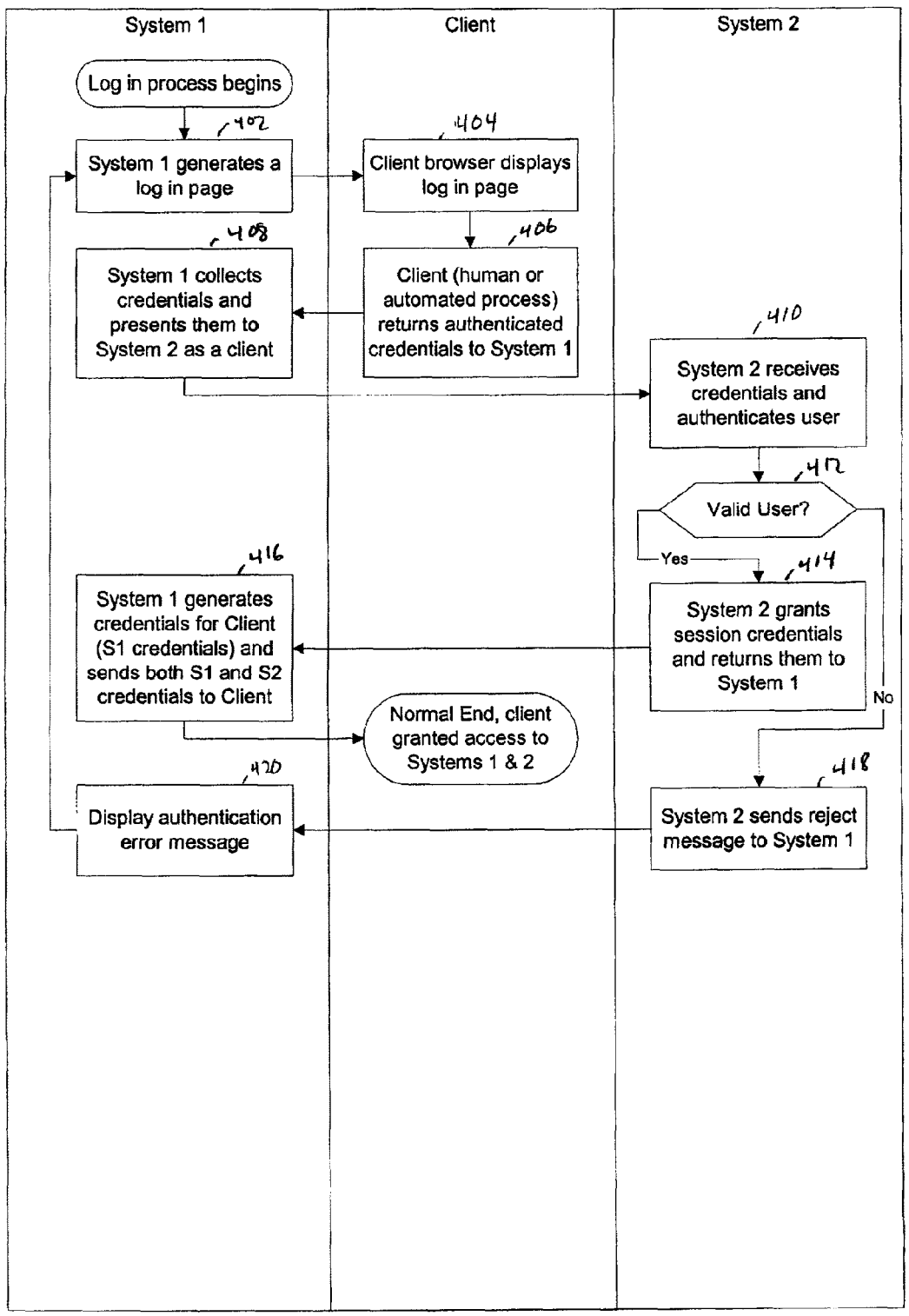
FIG. 4 illustrates steps in a method according to one embodiment of the invention.

Referring to FIG. 4, another embodiment of a log in method is illustrated.

At step 402, system 1 generates a log in page and sends the log in page to the client browser. Although sent by system 1, the log in page corresponds to system 2.

At step 404, the client browser displays the log in page, and at step 406, the client user, or an automated process, returns the required authentication credentials to system 1.

At step 408, system 1 collects the authentication credentials from the client browser and presents them to system 2, acting as the client.

At steps 410, 412, system 2 receives the credentials and authenticates the user.

If at step 412, system 2 determines that the user is valid, then at step 414, system 2 grants or validates the session credentials and returns them to system 1.

At step 416, based on the credentials granted by system 2, system 1 also generates credentials for the client (system 1 credentials) and sends both the system 1 and system 2 credentials to the client, thereby granting the client access to systems 1 and 2.

If at step 412, system 2 determines that the user is not valid, then at step 418, system 2 sends a reject message to system 1, and at step 420, system 1 displays an authentication error, and loops to step 402.

SPECIFIC EXAMPLES

Example 1

In this example, the two servers are in the same domain (per FIG. 2). The protocol in the example uses https, although it could be http.

Client has a previously established session with a server called "app2.jpmorgan.com" (system 2), and has session credentials from this system stored in the browser. The session credentials were stored by the browser due to app2.jpmorgan.com sending the following header to the client in response to the client's initial log-in to app2.jpmorgan.com: Set-Cookie: sso2cookie=2938ryfhs8dsjdgfas832fdjdijhHyGg; path=/; domain=.jpmorgan.com.

Client attempts to access the URL "https://app1.jpmorgan.com/" (system 1). Server app1.jpmorgan.com checks the user's HTTP headers for a session cookie named "sso1cookie", which is the name of the session cookie used by app1.jpmorgan.com's single sign-on system. There is no valid session cookie.

Server app1.jpmorgan.com (system 1) checks the user's HTTP headers for a session cookie named "sso2cookie", which is the name of the session cookie used by app2.jpmorgan.com's (system 2) single sign-on system. It finds that there is a cookie "sso2cookie" with a value "2938ryfhs8dsjdgfas832fdjdijhHyGg".

Server app1.jpmorgan.com (system 1) cannot by itself determine if this cookie corresponds to a valid session.

Server app1.jpmorgan.com sends an HTTP GET request to the URL "https://app2.jpmorgan.com/checkSession", and includes the cookie "sso2cookie=2938ryfhs8dsjdgfas832fdjdijhHyGg" in the HTTP headers for the request.

Server app2.jpmorgan.com (system 2) receives the request, and extracts the cookie sso2cookie from the request headers.

Server app2.jpmorgan.com checks the value of sso2cookie and determines that "2938ryfhs8dsjdgfas832fdjdijhHyGg" represents a valid session for the user named "username".

Server app2.jpmorgan.com (system 2) generates an HTTP response with response code 200, of MIME type "text/plain" and with a body of "username", and returns this as the response to the request from app1.jpmorgan.com (system 1).

Server app1.jpmorgan.com (system 1) checks the response from app2.jpmorgan.com (system 2). The response code is 200, which indicates a valid response, and the body of the response is "username" which tells app1.jpmorgan.com the user ID of the user attempting to access the system.

Server app1.jpmorgan.com generates an authenticated session for user "username" on its own system, and generates a session credential corresponding to this user session of "243879h43908gjw55ksuywel9". Server app1.jpmorgan.com returns a response to the client with a status code of 200 containing the content corresponding to the URL "https://app1.jpmorgan.com", personalized for user "username" and displaying only content that user is allowed to see. In the response, it adds the header: Set-Cookie: sso1cookie=243879h43908gjw55ksuywel9; path=/; domain=.jpmorgan.com.

Now that app1.jpmorgan.com has created a session for the user, subsequent requests will be accepted based on the presence of the cookie named "sso1cookie" in the request headers sent from the client.

Example 2

Figure 5:
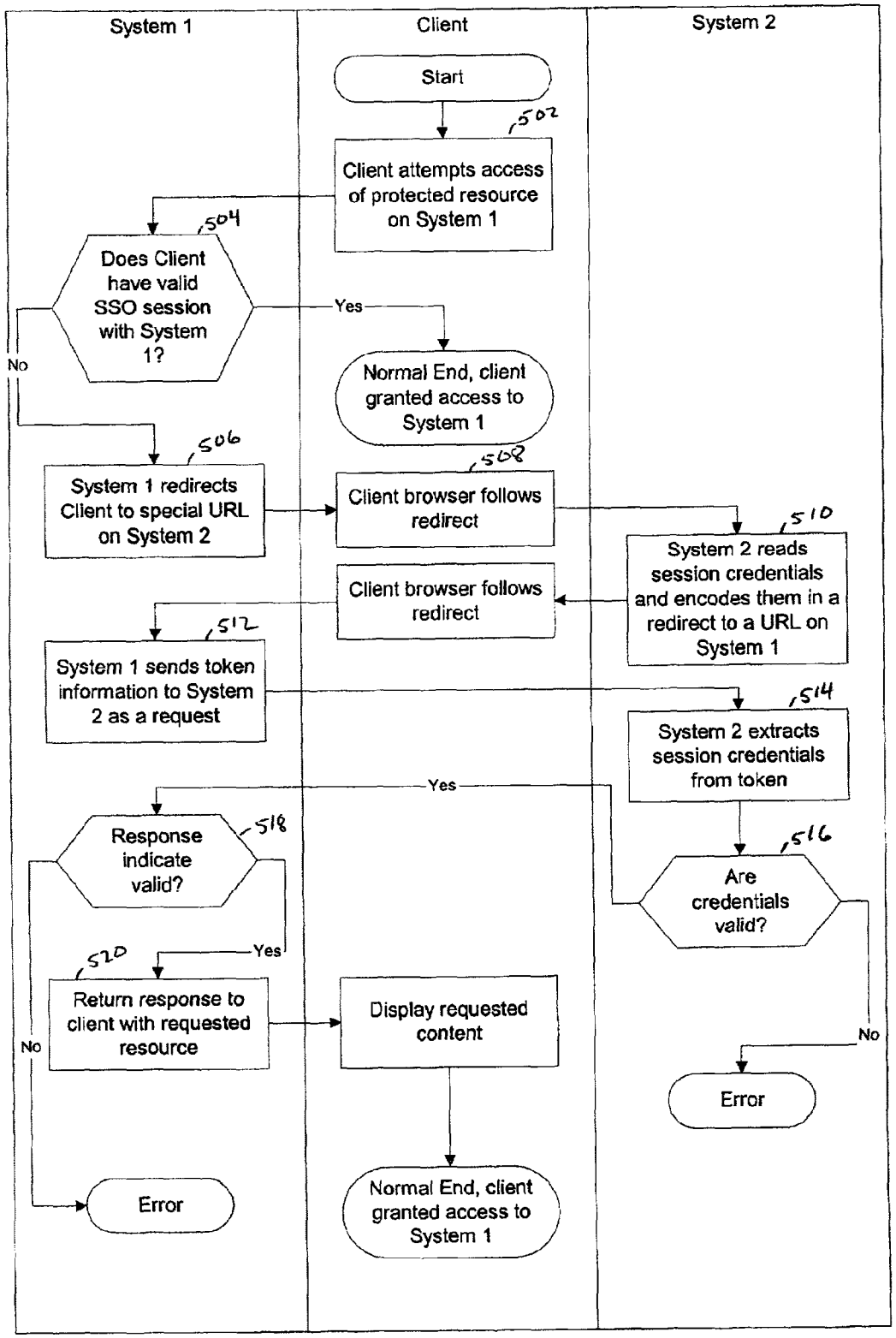
FIG. 5 illustrates steps in a method according to one embodiment of the invention.

In another example, the two servers are in different domains (Referring now to FIG. 5):

Client has a previously established session with a server called www.chase.com (system 2), and has session credentials from this system stored in the browser. The session credentials were stored by the browser due to app.chase.com sending the following header to the client in response to the client's initial log-in to www.chase.com: Set-Cookie: chasesso=2938ryfhs8dsjdgfas832fdjdijhHyGg; path=/; domain=.chase.com At step 502, client attempts to access the URL "https://www.jpmorgan.com/"

At step 504, server www.jpmorgan.com (system 1) checks the user's HTTP headers for a session cookie named "jpmsso", which is the name of the session cookie used by www.jpmorgan.com's single sign-on system.

If there is no valid session and no valid cookie, then at step 506, server www.jpmorgan.com (system 1) sends an HTTP response code of 302 ("redirect") to the client browser, with a redirection URL of "https://www.chase.com/getCredentials?from=www.jpmorgan.com"

At step 508, the client browser receives the response from www.jpmorgan.com and makes an HTTP GET request to the URL "https://www.chase.com/getCredentials?from=www.jpmorgan.com".

At step 510, the server www.chase.com (system 2) verifies that www.jpmorgan.com is a site with which session credentials may be shared, and sends an HTTP response code 302 ("redirect") to the client browser, with a redirection URL of "https://www.jpmorgan.com/login?chasesso=2938ryfhs8dsjdgfas832fdjdijhHyGg". Note that the redirection URL has as an argument the SSO credential for the user on the www.chase.com server.

At step 512, server www.jpmorgan.com (system 1) sends an HTTP GET request to the URL "https://www.chase.com/checkSession", and includes the cookie "chasesso=2938ryfhs8dsjdgfas832fdjdijhHyGg" in the HTTP headers for the request.

At step 514, server www.chase.com (system 2) receives the request, and extracts the cookie chasesso from the request headers.

At step 516, server www.chase.com checks the value of chasesso and determines that "2938ryfhs8dsjdgfas832fdjdijhHyGg" represents a valid session for the user named "username".

If there is a valid session for the user named "username", then server www.chase.com (system 2) generates an HTTP response with response code 200, of MIME type "text/plain" and with a body of "username", and returns this as the response to the request from www.jpmorgan.com.

At step 518, server www.jpmorgan.com (system 1) checks the response from www.chase.com. The response code is 200, which indicates a valid response, and the body of the response is "username" which tells www.jpmorgan.com the user ID of the user attempting to access the system. Server www.jpmorgan.com (system 1) generates an authenticated session for user "username" on its own system, and generates a session credential corresponding to this user session of "243879h43908gjw55ksuywel9".

At step 520, server www.jpmorgan.com (system 1) returns a response to the client with a status code of 200 containing the content corresponding to the URL "https://www.jpmorgan.com", personalized for user "username" and displaying only content that user is allowed to see. In the response, it adds the header: Set-Cookie: jpmsso=243879h43908gjw55ksuywel9; path=/; domain=.jpmorgan.com.

Now that www.jpmorgan.com (system 1) has created a session for the user, subsequent requests will be accepted based on the presence of the cookie named "jpmsso" in the request headers sent from the client.

Although illustrative embodiments have been described herein in detail, it should be noted and will be appreciated by those skilled in the art that numerous variations may be made within the scope of this invention without departing from the principle of this invention and without sacrificing its chief advantages. As examples of alternatives, some of the steps that are illustrated and described above may be omitted, or additional steps may be added.

The description provided above uses the Internet, browser applications and cookies. However, there is no intention to limit the invention to implementation using only the Internet, browser applications and cookies. The primary aspects are that session credentials that are held by one system (e.g., system 2) are used to establish or grant session credentials on another system (e.g., system 1), and the session credentials of system 2 are such that they are not directly available to or accessible by system 1, but held by the client as part of a session token or "cookie", and the session token information can be extracted by system 1 and then validated or authenticated with system 2.

Unless otherwise specifically stated, the terms and expressions have been used herein as terms of description and not terms of limitation. There is no intention to use the terms or expressions to exclude any equivalents of features shown and described or portions thereof and this invention should be defined in accordance with the claims that follow.

That which is claimed is:

1. A computer implemented method for validating credentials comprising:
   receiving, using a first computer system, a request to access the first computer system;
   making a determination, using the first computer system, that a client does not have a valid session credential to access the first computer system, wherein the determination further comprises whether the client has a valid session with a second computer system;
   retrieving, using the first computer system, information from a session token held by the client based at least in part on the determination that the client does not have a valid session credential to access the first computer system, the information corresponding to the valid session credential for the second computer system;
   transmitting, using the first computer system, at least a portion of the information from the session token to the second computer system; and
   granting, using the first computer system, the client access to the first computer system based at least in part on the determination that the client has a valid session credential with the second computer system.

2. The method according to claim 1, further comprising granting a session credential to the client by the first computer system, after determining that the client has a valid session credential granted by the second computer system.

3. The method according to claim 1, further comprising sending a session token to the client, the token corresponding to a session credential granted by the first computer system.

4. The method according to claim 1, wherein retrieving information from the session token held by the client comprises:
   sending a query to the client from the first computer system.

5. The method according to claim 4, the query including identification as originating from a domain name corresponding to the second computer system; and
   the method further including the step of receiving a response to the query.

6. The method according to claim 1, further comprising granting a session credential for the second computer system.

7. The method according to claim 1, further comprising associating session credentials for each of the first computer system and the second computer system with the client.

8. The method of claim 1, wherein a protected resource in the first computer system includes content provided on a pay-per-use basis, and wherein a protected resource in the second computer system includes content provided on a pay-per-use basis.

9. The method of claim 1, wherein a protected resource in the first computer system includes content provided on a subscription basis, and wherein a protected resource in the second computer system includes content provided on a subscription basis.

10. The method of claim 1, wherein the request to access the first computer system includes an authentication process.

11. The method of claim 10, the authentication process including a login in which the client enters a user name and password.

12. The method of claim 10, the authentication process including a login in which the client inputs biometric information.

13. The method of claim 10, the authentication process including a login in which the client inputs smartcard information.

14. The method of claim 1, the session token, held by the client, being in the form of a cookie.

15. The method of claim 1, wherein at least one of the first computer system and the second computer system provide a financial related protected resource to the client.

16. The method of claim 1, the method further including the first computer system directing the client to the second computer system in conjunction with said request to access the first computer system.

17. The method of claim 16, the method further including the first computer system directing the client to the second computer system in such a way that the second computer system redirects the client back to the first computer system.

18. The method of claim 17, the second computer system, after authentication by the second computer system, redirecting the client back to a login page of the first computer system.

19. Computer executable software code stored on a non-transitory computer-readable storage medium and transmitted as an information signal, the code for validating credentials, the code comprising:
   code to input, at first computer system, a request to access the first computer system;
   code to make a determination, at the first computer system, that a client does not have a valid session credential to access the first computer system, wherein the determination further comprises whether the client has a valid session with a second computer system;

code to retrieve, at the first computer system, information from a session token held by the client based at least in part on the determination that the client does not have a valid session credential to access the first computer system, the information corresponding to the valid session credential for the second computer system;

code to transmit, at the first computer system, at least a portion of the information from the session token to the second computer system; and code to grant, at the first computer system, the client access to the first computer system based at least in part on the determination that the client has a valid session credential with the second computer system; and the first computer system having a first protected resource that is accessible upon the client having the access to the first computer system; and the second computer system having a second protected resource that is accessible upon the client having the access to the first computer system.

* * * * *